US012467670B2

(12) United States Patent
Fujimoto et al.

(10) Patent No.: US 12,467,670 B2
(45) Date of Patent: Nov. 11, 2025

(54) HEAT PUMP DEVICE

(71) Applicants: DAIKIN INDUSTRIES, LTD., Osaka (JP); DAIKIN EUROPE N.V., Ostend (BE)

(72) Inventors: Yuusuke Fujimoto, Osaka (JP); Ryuuichi Toyota, Osaka (JP); Kentaroh Taoka, Osaka (JP); Atsushi Ohtani, Osaka (JP); Kevin Cornelis, Ostend (BE); David Steen, Ostend (BE)

(73) Assignees: DAIKIN INDUSTRIES, LTD., Osaka (JP); DAIKIN EUROPE N.V., Ostend (BE)

( * ) Notice: Subject to any disclaimer, the term of this patent is extended or adjusted under 35 U.S.C. 154(b) by 897 days.

(21) Appl. No.: 17/761,700

(22) PCT Filed: Sep. 8, 2020

(86) PCT No.: PCT/JP2020/033967
§ 371 (c)(1),
(2) Date: Mar. 18, 2022

(87) PCT Pub. No.: WO2021/054199
PCT Pub. Date: Mar. 25, 2021

(65) Prior Publication Data
US 2022/0390160 A1    Dec. 8, 2022

(30) Foreign Application Priority Data
Sep. 19, 2019    (JP) .................. 2019-170547
May 13, 2020    (JP) .................. 2020-084423

(51) Int. Cl.
*H02J 7/34*    (2006.01)
*F25B 30/02*    (2006.01)
(Continued)

(52) U.S. Cl.
CPC .............. *F25B 49/02* (2013.01); *F25B 30/02* (2013.01); *F25B 41/37* (2021.01);
(Continued)

(58) Field of Classification Search
CPC ............................. H02J 7/345; H02J 2207/50
(Continued)

(56) References Cited

U.S. PATENT DOCUMENTS 6,105,375 A    8/2000   Takano et al.
8,631,663 B2 †   1/2014   Wycoff
(Continued)

FOREIGN PATENT DOCUMENTS

CN    2814219 Y †   9/2006
CN    101373095 A †   2/2009
(Continued)

OTHER PUBLICATIONS

Extended European Search Report for European Application No. 20865536.5, dated Oct. 18, 2022.
(Continued)

*Primary Examiner* — Nathaniel R Pelton
(74) *Attorney, Agent, or Firm* — BIRCH, STEWART, KOLASCH & BIRCH, LLP

(57) ABSTRACT

A heat pump device having a refrigerant circuit includes: a valve configured to maintain an opening degree during non-energization; a valve drive circuit configured to cause operation of the valve; a valve controller configured to control the valve drive circuit; and a power source circuit configured to supply a power source to the valve drive circuit. The power source circuit includes: a first power source circuit unit configured to receive power source supply from outside to generate a DC voltage; and a second power source circuit unit for backup. The second power source circuit unit receives power source supply from the (Continued)

outside to store power in a capacitor, and connects the capacitor in parallel to a first output electric path of the first power source circuit unit.

15 Claims, 25 Drawing Sheets

(51) Int. Cl.
 *F25B 41/37* (2021.01)
 *F25B 49/02* (2006.01)
(52) U.S. Cl.
 CPC . *F25B 2500/222* (2013.01); *F25B 2600/2521* (2013.01); *F25B 2700/15* (2013.01)
(58) Field of Classification Search
 USPC .................................................. 320/160, 166
 See application file for complete search history.

(56) References Cited

U.S. PATENT DOCUMENTS

| | | | | |
|---|---|---|---|---|
| 9,840,151 | B2 † | 12/2017 | Momo | |
| 11,239,671 | B2 * | 2/2022 | Yamaguchi | ........... H02J 7/0048 |
| 2004/0178681 | A1 | 9/2004 | Klenner | |
| 2010/0280669 | A1 * | 11/2010 | Wycoff | ................. F25B 49/005 |
| | | | | 700/282 |
| 2011/0254515 | A1 * | 10/2011 | Hara | ..................... H02J 7/0071 |
| | | | | 320/167 |
| 2017/0350164 | A1 | 12/2017 | Ikemoto | |
| 2018/0045424 | A1 | 2/2018 | Yajima et al. | |
| 2019/0181712 | A1 | 6/2019 | Aso et al. | |
| 2019/0368782 | A1 | 12/2019 | Wada et al. | |
| 2019/0390876 | A1 | 12/2019 | Matsuda et al. | |
| 2020/0318840 | A1 | 10/2020 | Wada et al. | |
| 2021/0100579 | A1 † | 4/2021 | Shelton | |

FOREIGN PATENT DOCUMENTS

| | | | | |
|---|---|---|---|---|
| CN | 101860084 | A | | 10/2010 |
| CN | 102954614 | A † | | 3/2013 |
| CN | 204391734 | U | | 6/2015 |
| CN | 104833123 | A | | 8/2015 |
| CN | 204558613 | | * | 8/2015 |
| CN | 204558613 | U † | | 8/2015 |
| CN | 207455945 | | * | 6/2018 |
| CN | 207455945 | U † | | 6/2018 |
| CN | 207778882 | U † | | 8/2018 |
| CN | 108644986 | A † | | 10/2018 |
| CN | 108709284 | A | | 10/2018 |
| CN | 108870816 | A † | | 11/2018 |
| CN | 109307092 | A † | | 2/2019 |
| EP | 2 559 959 | A2 | | 2/2013 |
| EP | 3260791 | | * | 12/2017 |
| EP | 3260791 | A1 † | | 12/2017 |
| JP | 4-270863 | A | | 9/1992 |
| JP | 8-138747 | A | | 5/1996 |
| JP | 9-135767 | A | | 5/1997 |
| JP | 9-285024 | A | | 10/1997 |
| JP | 2000-219033 | A | | 8/2000 |
| JP | 2004-053050 | A † | | 2/2004 |
| JP | 2005-121333 | A | | 5/2005 |
| JP | 2005337687 | | * | 12/2005 |
| JP | 2005337687 | A † | | 12/2005 |
| JP | 4029580 | B2 † | | 1/2008 |
| JP | 2003-130482 | | * | 4/2008 |
| JP | 2003-130482 | A † | | 4/2008 |
| JP | 2008-286464 | A | | 11/2008 |
| JP | 2009-134564 | A | | 6/2009 |
| JP | 2010-58609 | A | | 3/2010 |
| JP | 2010-68620 | A | | 3/2010 |
| JP | 2010068620 | A † | | 3/2010 |
| JP | 2010-178528 | A | | 8/2010 |
| JP | 2013-215012 | A | | 10/2013 |
| JP | 2015-104938 | A | | 6/2015 |
| JP | 2015-141000 | A | | 8/2015 |
| JP | 2016-95130 | A | | 5/2016 |
| JP | 2016-211762 | A | | 12/2016 |
| WO | WO2016/103329 | A1 | | 6/2016 |
| WO | WO 2018/025367 | A1 | | 2/2018 |
| WO | WO 2018/078729 | A1 | | 5/2018 |
| WO | WO 2018/167811 | A1 | | 9/2018 |
| WO | WO 2018/216127 | A1 | | 11/2018 |

OTHER PUBLICATIONS

International Preliminary Report on Patentability and English translation of the Written Opinion of the International Searching Authority, for International Application No. PCT/JP2020/033967, mailed Mar. 31, 2022.
International Search Report (PCT/ISA/210) issued in PCT/JP2020/033967, dated Nov. 2, 2020.
Written Opinion of the International Searching Authority (PCT/ISA/237) issued in PCT/JP2020/033967, dated Nov. 2, 2020.

* cited by examiner
† cited by third party

HEAT PUMP DEVICE

TECHNICAL FIELD

The present disclosure relates to a heat pump device.

BACKGROUND ART

As a heat pump device that executes a refrigeration cycle by using a refrigerant, there is known a heat pump device configured to close a valve (shutoff valve) when detecting refrigerant leakage, in preparation for refrigerant leakage (see, for example, Patent Literature 1 (WO 2018/167811 A1)). By closing the valve, further refrigerant leakage can be suppressed.

SUMMARY OF THE INVENTION

Technical Problem

There is a valve of a type in which an opening degree of the valve is maintained as it is during non-energization where a power source is turned off, and such a valve is common in use. In a heat pump device using such a type of valve, if a power failure occurs and refrigerant leakage is detected at that time, the valve cannot be fully closed.

An object of the present disclosure is to close a valve even when refrigerant leakage occurs during a power failure, in a heat pump device including the valve configured to maintain an opening degree during non-energization.

Solutions to Problem (1) A heat pump device according to the present disclosure is a heat pump device including a refrigerant circuit. The heat pump device includes: a valve provided on the refrigerant circuit and configured to maintain an opening degree during non-energization; a valve drive circuit configured to cause operation of the valve; a valve control unit configured to control the valve drive circuit; and a power source circuit configured to supply a power source to the valve drive circuit. The power source circuit includes: a first power source circuit unit configured to receive power source supply from the outside to generate a DC voltage; and a second power source circuit unit for backup configured to receive power source supply from the outside to store power in a capacitor, and connect the capacitor in parallel to a first output electric path of the first power source circuit unit.

In the heat pump device described above, when power source supply from the outside is lost due to a power failure, the valve can be closed by discharging the capacitor of the second power source circuit unit. Therefore, at a time of power failure, the valve can be closed in preparation for refrigerant leakage.

The following (2) to (10) and (12) to (21) are optional contents.

(2) In the heat pump device according to (1) described above, the capacitor has a capacity to store an amount of electricity required to fully close the valve from fully open.

In this case, even if a power failure occurs when the valve is fully open, the valve can be fully closed from there.

(3) In the heat pump device of (1) or (2) described above, the refrigerant circuit may include a gas-side refrigerant pipe and a liquid-side refrigerant pipe, the valve may include a valve on a gas side provided in the gas-side refrigerant pipe and a valve on a liquid side provided in the liquid-side refrigerant pipe, and the capacitor may have a capacity to store the amount of electricity required to fully close each of the valves from fully open.

In this case, even if a power failure occurs when the valves are fully open, each valve can be fully closed from there.

(4) In the heat pump device of (3) described above, the valve control unit may cause each of the valves to perform a close operation in order from any one of the valves.

In this case, since a maximum current value can be suppressed as compared with the case of causing a plurality of valves to perform the close operation at the same time, a voltage drop at that time can also be suppressed. This increases a possibility that at least one valve caused to perform the close operation first can be fully closed, even if the amount of electricity of the capacitor is not sufficient.

(5) The heat pump device according to any one of (1) to (4) described above may further include a refrigerant sensor configured to detect refrigerant leakage, and when the refrigerant sensor detects refrigerant leakage, the valve control unit may cause operation of the valve drive circuit to close the valve in a state where the capacitor is charged.

Even if a power failure occurs after detection of refrigerant leakage, the valve can be closed by discharging the charged capacitor.

(6) In the heat pump device according to any one of (1) to (5) described above, the first power source circuit unit and the valve drive circuit may be mounted on a first board, and the second power source circuit unit may be mounted on a second board different from the first board.

In this case, it is easy to add, to a place where the existing first board is present, the second board on which the second power source circuit unit is mounted.

(7) In the heat pump device according to (6) described above, the first board may be provided with: a power failure detection circuit configured to detect a voltage input to the first power source circuit unit or a voltage of a second output electric path, in which the voltage of the second output electric path is insulated from the first output electric path and is output from the first power source circuit unit; and the valve control unit. Further, the valve control unit may output a command to close the valve in accordance with power failure detection by the power failure detection circuit.

In this case, the valve can be reliably closed in accordance with power failure detection.

(8) In the heat pump device according to any one of (1) to (7) described above, the second power source circuit unit includes, for example: a rectification unit for a direct current from an alternating current; a switching power source unit configured to step down an output voltage of the rectification unit to a predetermined DC voltage; a charge circuit unit configured to perform from constant current charging to constant voltage charging based on an output of the switching power source unit; an electric double-layer capacitor connected to the charge circuit unit; a boost circuit unit configured to boost an output voltage of the electric double-layer capacitor to a predetermined DC voltage; and a diode provided on a positive-side electric path at an output end of the boost circuit unit, and having a forward direction in a direction connecting from the positive-side electric path to the first power source circuit unit.

According to this circuit configuration, the electric double-layer capacitor is charged via the rectification unit, the switching power source unit, and the charge circuit unit. When there is an output voltage of the first power source circuit unit, the electric double-layer capacitor is not discharged due to reverse blocking of the diode, and electric charges are stored in a full charge state. When the output voltage of the first power source circuit unit is lost due to a power failure, the output voltage of the electric double-layer capacitor is supplied to the valve drive circuit via the boost circuit unit and the diode.

(9) The heat pump device according to any one of (1) to (8) may further include a remote controller to perform an operation manipulation, and the remote controller may include a display unit configured to display information related to an open or closed state of the valve.

In this case, the open or closed state of the valve can be confirmed on the display unit of the remote controller.

(10) The heat pump device according to any one of (1) to (9) may further include a main control unit configured to control a refrigeration cycle operation, and the main control unit may perform the refrigeration cycle operation only when the valve control unit can communicate with the main control unit.

In this case, it is possible to implement an interlock function of not operating the heat pump device when communication cannot be performed.

(11) From the viewpoint of a valve kit, the valve kit includes: a valve provided on a refrigerant circuit and configured to maintain an opening degree during non-energization; a valve board including a valve drive circuit configured to cause operation of the valve, and a first power source circuit unit configured to receive power source supply from the outside to generate a DC voltage to supply to the valve drive circuit; and a backup board including a second power source circuit unit that receives power source supply from the outside to store power in a capacitor and connects the capacitor in parallel to an output electric path of the first power source circuit unit.

In the valve kit described above, when power source supply from the outside is lost due to a power failure, the valve can be closed by discharging the capacitor of the second power source circuit unit. Therefore, at a time of power failure, the valve can be closed in preparation for refrigerant leakage.

(12) The valve kit of (11) described above may be provided in a refrigerant pipe that connects a heat source-side unit and a use-side unit to each other.

In this case, disposing the valve kit enables refrigerant leakage to be easily blocked between the heat source-side unit and the use-side unit.

(13)

In a heat pump device that executes a refrigeration cycle by using a refrigerant, an electric valve is used on a refrigerant circuit. In such a heat pump device, control for returning the electric valve to an initial state may be performed when operation is stopped. When the operation is stopped due to a power failure, it is also considered to cause operation of the electric valve by using electric charges remaining in a large-capacity capacitor such as an electrolytic capacitor.

Even when a service engineer intentionally cuts off an AC power source for internal inspection of the heat pump device, control similar to that for a power failure may be performed. In this case, even when the electric valve is closed, sufficient electric charges may still remain in the capacitor. Under such circumstances, for example, it is not preferable to touch an electric path with a wet hand. Further, in a case where a metal tool accidentally short-circuits between an electric path and ground potential (GND), peripheral damage due to generation of sparks may also occur.

An object of the technology in and after (14) is to provide a heat pump device capable of quickly discharging electric charges remaining in a power storage (capacitor) such as an internal capacitor.

(14) The heat pump device according to any one of (1) to (10) described above further includes a discharge circuit configured to discharge electric charges stored in the capacitor.

In such a heat pump device, a voltage of an electric path connected to the capacitor can be lost by rapid discharge of electric charges.

(15) In the heat pump device of (14) described above, the discharge circuit may include a discharge switch, and electric charges stored in the capacitor may be discharged by closing the discharge switch.

In this case, unnecessary discharging can be suppressed.

(16) In the heat pump device according to (15) described above, the discharge switch is preferably of an automatic return type.

In this case, it is possible to suppress erroneous meaningless discharging.

(17) In the heat pump device according to (15) described above, the power source circuit may have an interlock function that enables operation of the heat pump device only when the discharge switch is open.

In this case, it is possible to suppress the operation of the heat pump device in a state where the discharge switch is closed.

(18) The heat pump device of (14) described above may have a configuration in which a detection circuit configured to detect a power failure of an AC power source is provided, and the detection circuit having detected a power failure causes discharging by the discharge circuit.

In this case, discharging can be reliably performed without depending on an action of an inspection worker.

(19) The heat pump device according to any one of (14) to (18) described above preferably includes a notification device configured to notify of completion of discharging of the capacitor by the discharge circuit.

In this case, the inspection worker can intuitively grasp a state of power storage.

(20) In the heat pump device according to (19) described above, the notification device is only required to be in mutually different notification states before a start of discharging and at the completion of discharging. In this case, the inspection worker can easily confirm the completion of discharging.

(21) In the heat pump device of (15), (16), or (17) described above, the discharge switch may be provided at a position to be exposed when a cover that is a part of a housing accommodating the power source circuit is removed.

In this case, it is easy to find the discharge switch.

DESCRIPTION OF EMBODIMENTS (1) First Embodiment

Hereinafter, an embodiment of a heat pump device will be described.

A representative example of the heat pump device is an air conditioner. Hereinafter, an air conditioner will be described as an example.

(1-1) Refrigerant Circuit

Figure 1:
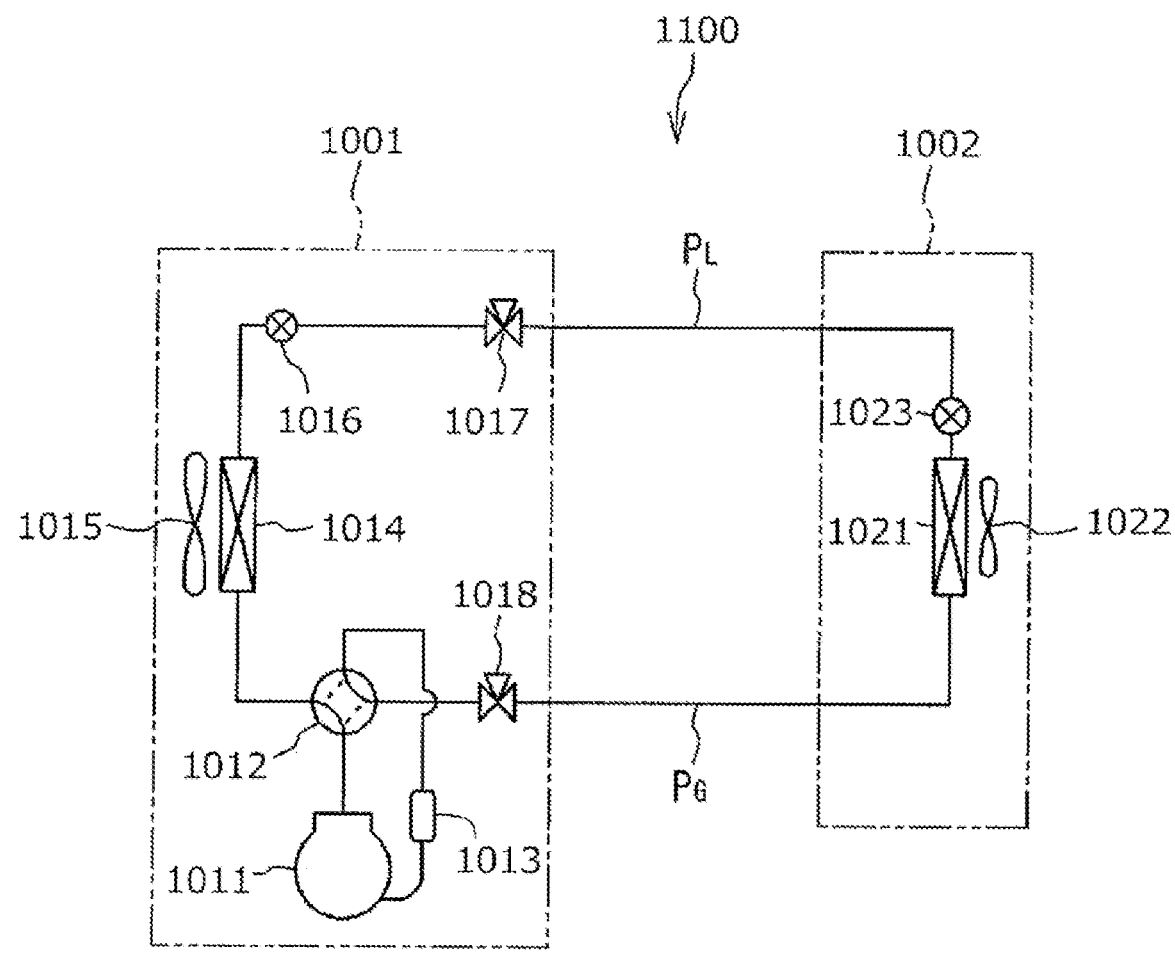
FIG. 1 is a diagram illustrating a refrigerant circuit of an air conditioner as an example of a heat pump device.

FIG. 1 is a diagram illustrating a refrigerant circuit of an air conditioner 1100 as an example of a heat pump device. In the figure, an outdoor unit 1001 as a heat source-side unit includes a compressor 1011, a four-way switching valve 1012, an accumulator 1013, a heat exchanger 1014, a fan 1015, an expansion valve 1016, a liquid-side valve (shutoff valve) 1017, and a gas-side valve (shutoff valve) 1018. An indoor unit 1002 as a use-side unit includes a heat exchanger 1021, a fan 1022, and an expansion valve 1023. The outdoor unit 1001 and the indoor unit 1002 are connected to each other via refrigerant pipes $P_L$ and $P_G$, to form the refrigerant circuit as illustrated in the figure. The valves 1017 and 1018 are electric valves, and an electronic expansion valve can also be used, for example. Note that FIG. 1 is a simplest example for description, and a plurality of indoor units 1002 are normally connected in parallel to the common outdoor unit 1001.

The four-way switching valve 1012 during cooling operation has an internal flow path as indicated by a solid line. This forms a flow path of a refrigerant returning from the compressor 1011 to the compressor 1011 through the four-way switching valve 1012, the heat exchanger 1014, the expansion valve 1016, the opened valve 1017, the expansion valve 1023, the heat exchanger 1021, the opened valve 1018, the four-way switching valve 1012, and the accumulator 1013. At this time, the heat exchanger 1014 of the outdoor unit 1001 functions as a condenser, and the heat exchanger 1021 of the indoor unit 1002 functions as an evaporator.

The four-way switching valve 1012 during heating operation has an internal flow path as indicated by a dotted line. This forms a flow path of a refrigerant returning from the compressor 1011 to the compressor 1011 through the four-way switching valve 1012, the opened valve 1018, the heat exchanger 1021, the expansion valve 1023, the opened valve 1017, the expansion valve 1016, the heat exchanger 1014, the four-way switching valve 1012, and the accumulator 1013. At this time, the heat exchanger 1014 of the outdoor unit 1001 functions as an evaporator, and the heat exchanger 1021 of the indoor unit 1002 functions as a condenser.

(1-2) Control Circuit Related to Valve

Next, a control circuit related to the valves 1017 and 1018 will be described.

Figure 2:
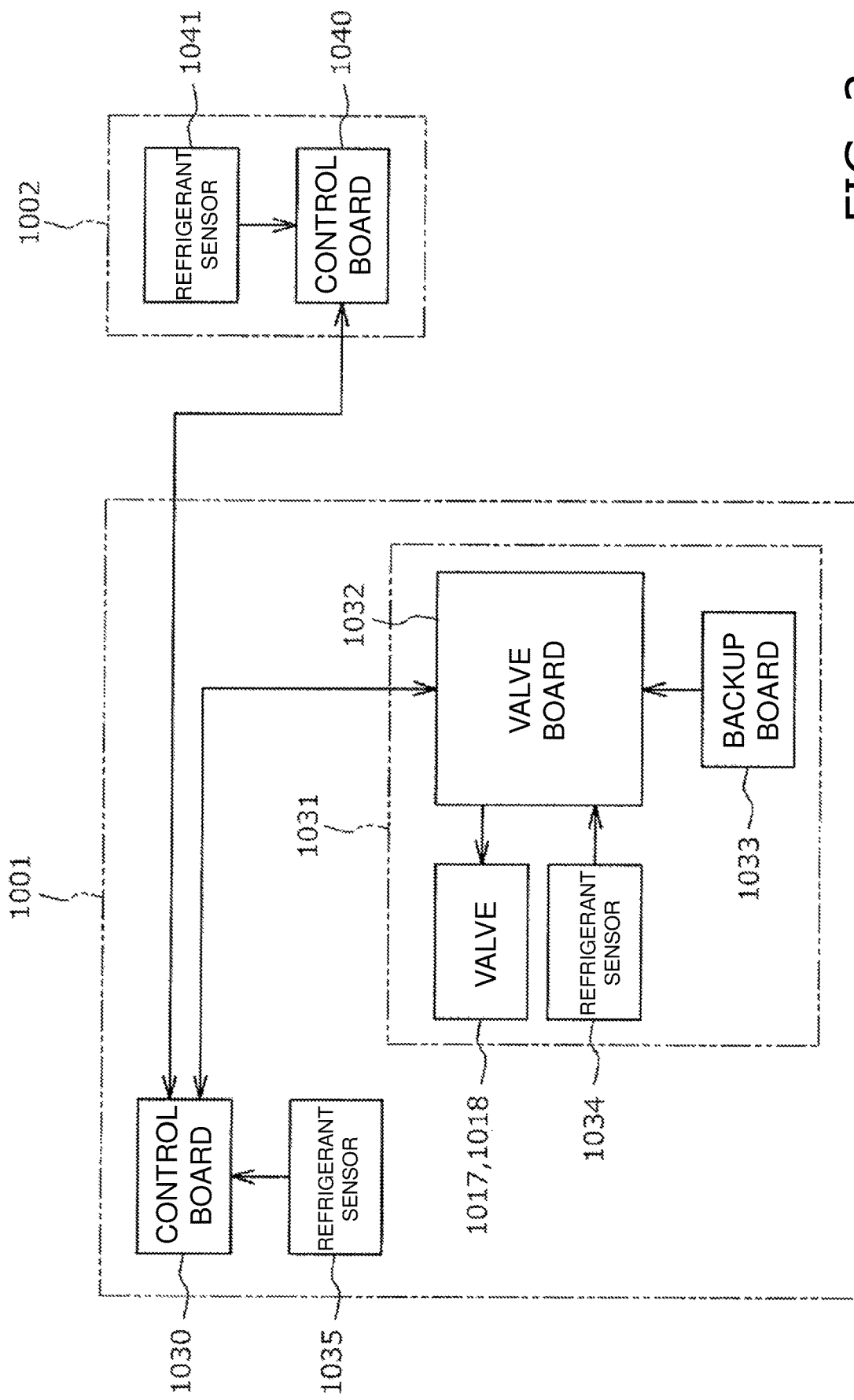
FIG. 2 is an electrical connection diagram in the air conditioner.

FIG. 2 is an electrical connection diagram of the air conditioner 1100. In FIG. 2, the outdoor unit 1001 includes a control board 1030, a valve board 1032, a backup board 1033, and refrigerant sensors 1034 and 1035, in addition to the valves 1017 and 1018. The control board 1030 is a main control unit that is mounted with a microcomputer, and controls the refrigeration cycle operation of the entire air conditioner. The valve board 1032 is also mounted with a microcomputer. The valve board 1032, the backup board 1033, the refrigerant sensor 1034, and the valves 1017 and 1018 constitute a valve kit 1031 specialized for controlling the valves 1017 and 1018. The control board 1030 and the valve board 1032 can communicate with each other.

When the refrigerant leaks, the refrigerant sensor 1034 detects the refrigerant leakage and transmits a detection signal to the valve board 1032. Similarly, when the refrigerant leaks, the refrigerant sensor 1035 detects the refrigerant leakage and transmits a detection signal to the control board 1030. Although this example is an example in which the two refrigerant sensors 1034 and 1035 are provided, only one refrigerant sensor may be provided to transmit the detection signal to both the control board 1030 and the valve board 1032.

The indoor unit 1002 includes a control board 1040 on which a microcomputer is mounted, and a refrigerant sensor 1041 configured to detect refrigerant leakage in the indoor unit 1002 when the refrigerant leakage occurs. The control board 1040 can communicate with the control board 1030 of the outdoor unit 1001.

Figure 3:
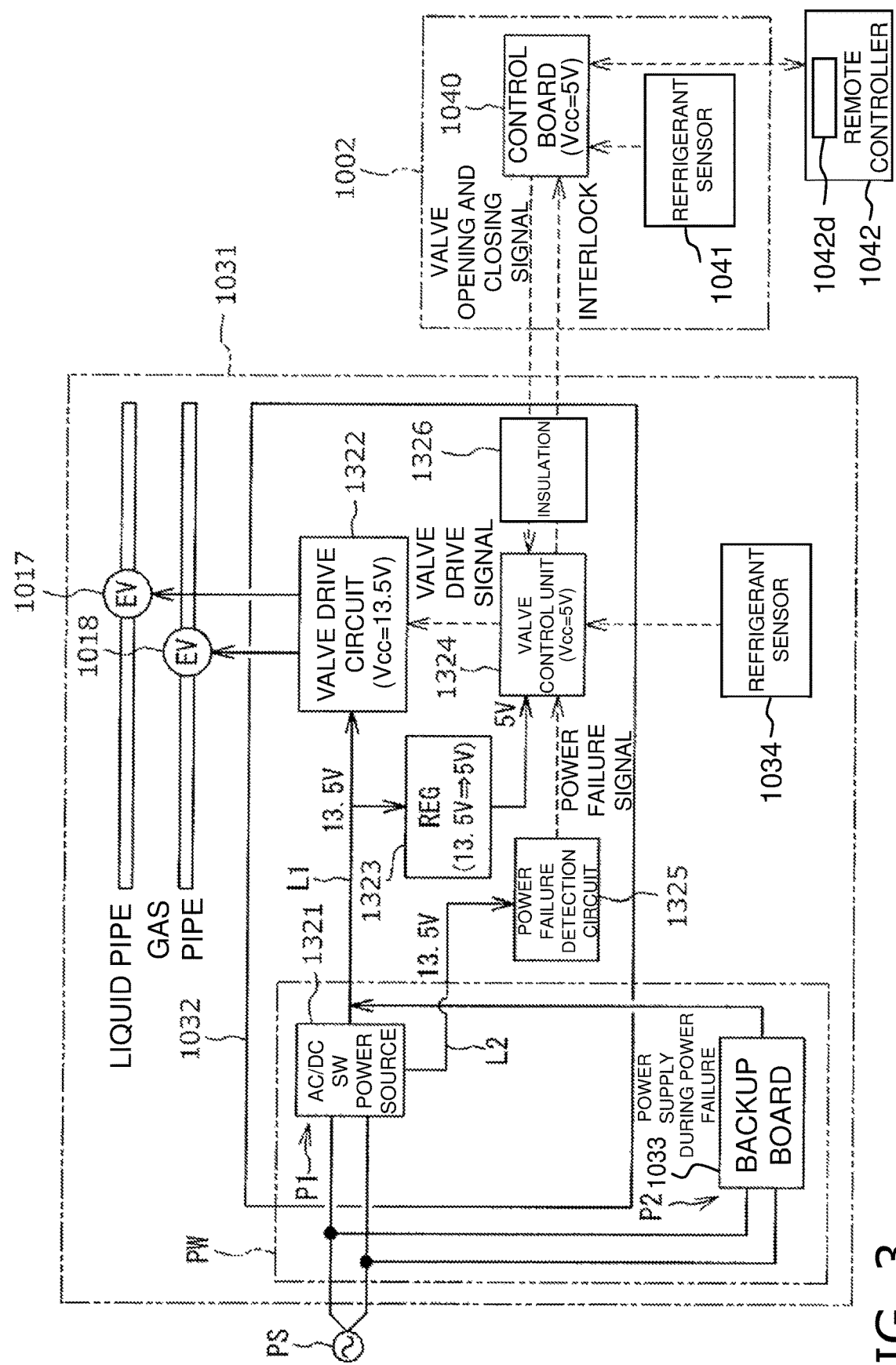
FIG. 3 is a circuit diagram illustrating a valve kit in more detail.

FIG. 3 is a circuit diagram illustrating the valve kit 1031 in more detail. A solid line in a circuit in the figure represents a power source line, and a broken line represents a signal line. An AC voltage (for example, single-phase 230 V±10% AC) is supplied from an external AC power source PS to the valve board 1032. Note that, for the AC voltage, two-phase two wires may be extracted from a three-phase AC power source. Similarly, an AC voltage is also supplied to the backup board 1033.

The valve board 1032 includes an AC and DC switching power source 1321, a valve drive circuit 1322, a regulator 1323, a valve control unit 1324, a power failure detection circuit 1325, and an insulation circuit 1326. The AC and DC switching power source 1321 converts 230 V AC to a DC voltage (13.5 V DC in the present embodiment). The output of 13.5 V DC is output while two systems are insulated from each other. A first output electric path L1 that is one of the two systems is connected to the valve drive circuit 1322 and the regulator 1323, and a second output electric path L2 that is another one of the two systems is connected to the power failure detection circuit 1325.

The valve drive circuit 1322 can open and close the valves 1017 and 1018 based on an input voltage of 13.5 V DC and a valve drive signal from the valve control unit 1324. The regulator 1323 steps down the 13.5 V DC (steps down to 5 V DC in the present embodiment) and supplies a power source voltage (Vcc) to the valve control unit 1324. The valve control unit 1324 is mounted with a microcomputer.

The power failure detection circuit 1325 detects a power failure when the voltage of 13.5 V DC supplied from the AC and DC switching power source 1321 decreases. Note that the power failure may be detected through a voltage obtained by further stepping down 13.5 V DC. Further, the power failure detection circuit 1325 can also detect a power failure through a decrease in an AC voltage input to the AC and DC switching power source 1321.

When detecting the power failure, the power failure detection circuit 1325 transmits a power failure signal to the valve control unit 1324. When detecting refrigerant leakage, the refrigerant sensor 1034 transmits a detection signal to the valve control unit 1324. Also on the indoor unit 1002 side, when detecting refrigerant leakage, the refrigerant sensor 1041 transmits a detection signal to the valve control unit 1324 via the control board 1040. The control board 1040 is connected to a remote controller 1042. The remote controller 1042 includes a display unit 1042*d* configured to display information related to an open or closed state of the valves 1017 and 1018.

The information related to the open or closed state of the valves 1017 and 1018 is, for example, displaying whether the valves are open or closed. This enables confirmation of the open or closed state of the valves 1017 and 1018 on the display unit 1042*d* of the remote controller 1042. In addition, information estimated from the open or closed state of the valves 1017 and 1018 may be displayed on the display unit 1042*d*. For example, when the refrigerant leaks, the valve is to be fully closed, and thus information such as "refrigerant leakage has occurred" can also be displayed on the remote controller.

Between the control board 1040 of the indoor unit 1002 and the valve control unit 1324 of the outdoor unit 1001, the insulation circuit 1326 that insulates a signal voltage and relays a signal is provided. Although not illustrated in FIG. 3, the valve control unit 1324 of the valve board 1032 and the control board 1040 of the indoor unit 1002 can communicate with the control board 1030 (FIG. 2) of the outdoor unit 1001 as described above.

In the case where the AC power source PS is normally supplying a voltage, when an operation start manipulation of the air conditioner is performed from the remote controller 1042, the valve control unit 1324 transmits a drive signal to the valve drive circuit 1322. The valve drive circuit 1322 having received the drive signal opens the valves 1017 and 1018. Further, an operation start command is transmitted from the control board 1040 of the indoor unit 1002 to the control board 1030 of the outdoor unit 1001, and the operation of the air conditioner is started.

When the refrigerant sensor 1034 or the refrigerant sensor 1041 detects refrigerant leakage during the operation of the air conditioner, the control board 1030 (FIG. 2) is notified of the refrigerant leakage from the valve control unit 1324 or the control board 1040, and the operation of the air conditioner is stopped. In addition, the valve control unit 1324 transmits a drive signal to the valve drive circuit 1322 to fully close the valves 1017 and 1018. The control board 1030 (FIG. 2) of the outdoor unit 1001 performs the refrigeration cycle operation only when communication with the valve control unit 1324 is possible. This makes it possible to implement an interlock function of not operating the air conditioner when communication cannot be performed.

In the case where the AC power source PS is normally supplying a voltage, when an operation stop manipulation of the air conditioner is performed from the remote controller 1042, the operation of the air conditioner is stopped, but the valves 1017 and 1018 remain open when there is no refrigerant leakage.

Even while the air conditioner is stopped, the AC power source PS is active, which causes a voltage to be supplied to the valve board 1032 and the backup board 1033.

In a circuit configuration of the valve kit 1031 described above, a power source circuit PW configured to supply a power source (13.5 V DC) to the valve drive circuit 1322 includes: a first power source circuit unit P1 configured to receive power source supply from the external AC power source PS to generate a DC voltage (13.5 V DC); and a second power source circuit unit P2 configured to generate a DC voltage (13.5 V DC) by the backup board 1033 configured to receive power source supply from the external AC power source PS. As will be described later, the second power source circuit unit P2 is a power source circuit unit for backup at a time of power failure, in which the power source circuit unit stores power in a capacitor mounted on the backup board 1033 and connects the capacitor in parallel to the first output electric path L1 of the first power source circuit unit P1.

Note that output of the backup board 1033 is not connected to the second output electric path L2 from the first power source circuit unit P1 (the AC and DC switching power source 1321) to the power failure detection circuit 1325. During a power failure, a backup voltage is supplied from the second power source circuit unit P2 to the first output electric path L1, but the voltage is not supplied to the second output electric path L2. Therefore, the voltage of the second output electric path L2 is lost during the power failure.

(1-3) Backup Board

Figure 4:
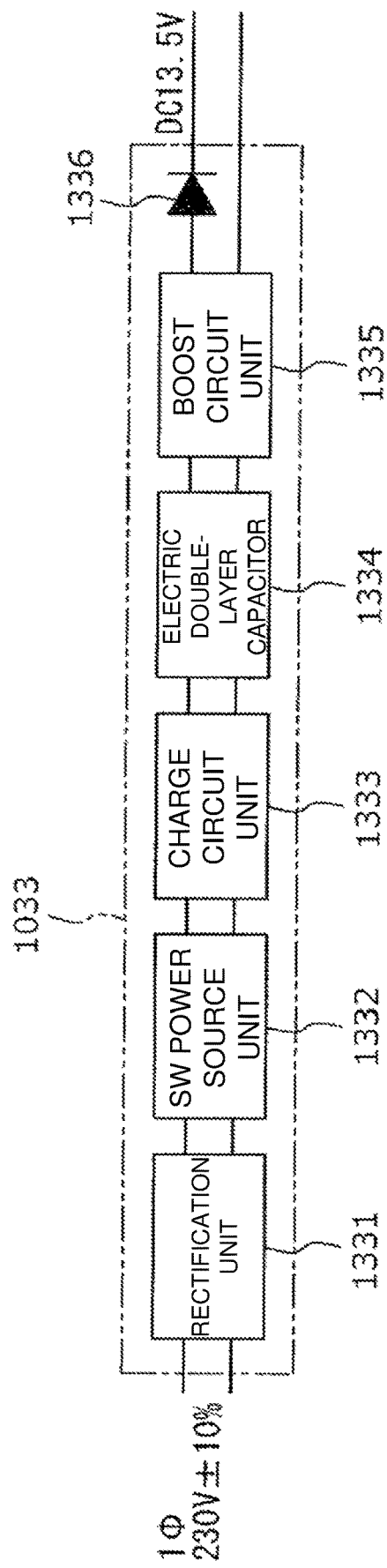
FIG. 4 is an internal circuit diagram of a backup board.

FIG. 4 is an internal circuit diagram of the backup board 1033. The backup board 1033 includes a rectification unit 1331, a switching power source unit 1332, a charge circuit unit 1333, an electric double-layer capacitor 1334, a boost circuit unit 1335, and a diode 1336. The rectification unit 1331 rectifies and smooths single-phase 230 VAC to a DC voltage. The switching power source unit 1332 converts the DC voltage into a stable DC low voltage. The charge circuit unit 1333 charges the electric double-layer capacitor 1334 based on the DC voltage provided from the switching power source unit 1332. The electric double-layer capacitor 1334 has a large capacity of, for example, 82 farads.

Using the capacitor makes it possible to simplify a circuit and downsize a circuit board as compared with the case of using another auxiliary power source (a battery or the like). In addition, using the electric double-layer capacitor makes it possible to secure a large electrostatic capacity while further reducing a size of the board. Note that a type of the capacitor is not limited to the electric double-layer.

Figure 5:
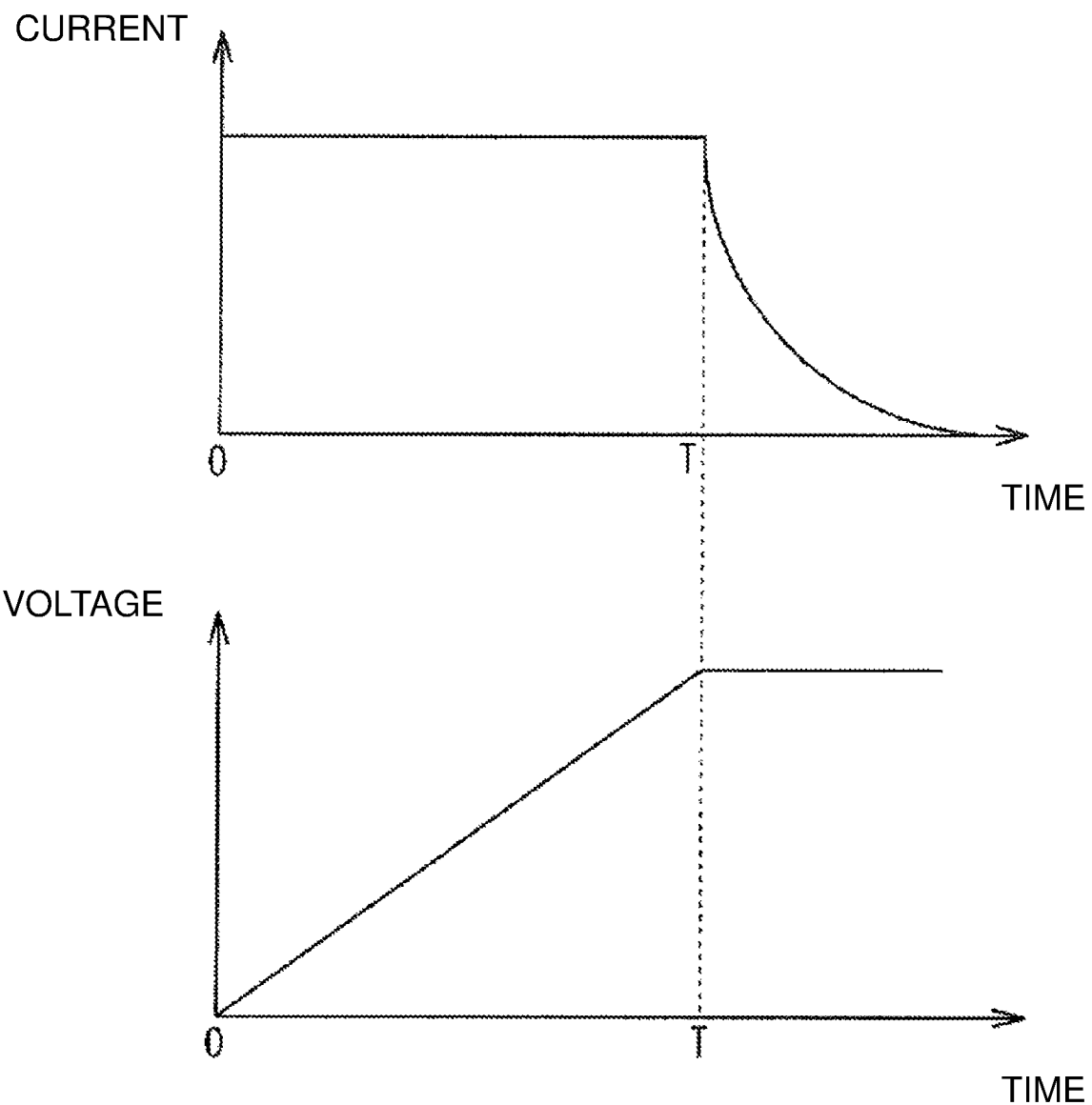
FIG. 5 is a graph illustrating an example of a state of charging executed by a charge circuit unit.

FIG. 5 is a graph illustrating an example of a state of charging executed by the charge circuit unit 1333. From a start of charging to time T close to full charging, charging is performed at a constant current. An open-end voltage of the electric double-layer capacitor 1334 increases substantially linearly. Then, after the time T, charging is performed at a low voltage. Thereafter, the charging current gradually decreases, and the charging is completed when the charging current becomes zero.

Returning to FIG. 4, an output voltage (for example about 7 V DC) between both end electrodes of the electric double-layer capacitor 1334 is input to the boost circuit unit 1335. The boost circuit unit 1335 is a semiconductor obtained by integrating a boosting chopper into one chip, and boosts the DC voltage to 13.5 V. The diode 1336 suppresses useless discharging of the electric double-layer capacitor 1334. When the AC power source PS is supplying a normal voltage, the output voltage of the AC and DC switching power source 1321 (FIG. 3) maintains 13.5 V, so that the potential becomes the same between an anode and a cathode of the diode 1336, and thus the electric double-layer capacitor 1334 does not discharge. However, when there is a power failure in the AC power source PS, since the output voltage of the AC and DC switching power source 1321 (FIG. 3) becomes zero, a forward voltage of the diode 1336 is generated, and thus the electric double-layer capacitor 1334 is discharged.

(1-4) Operation at Time of Power Failure

Figure 6:
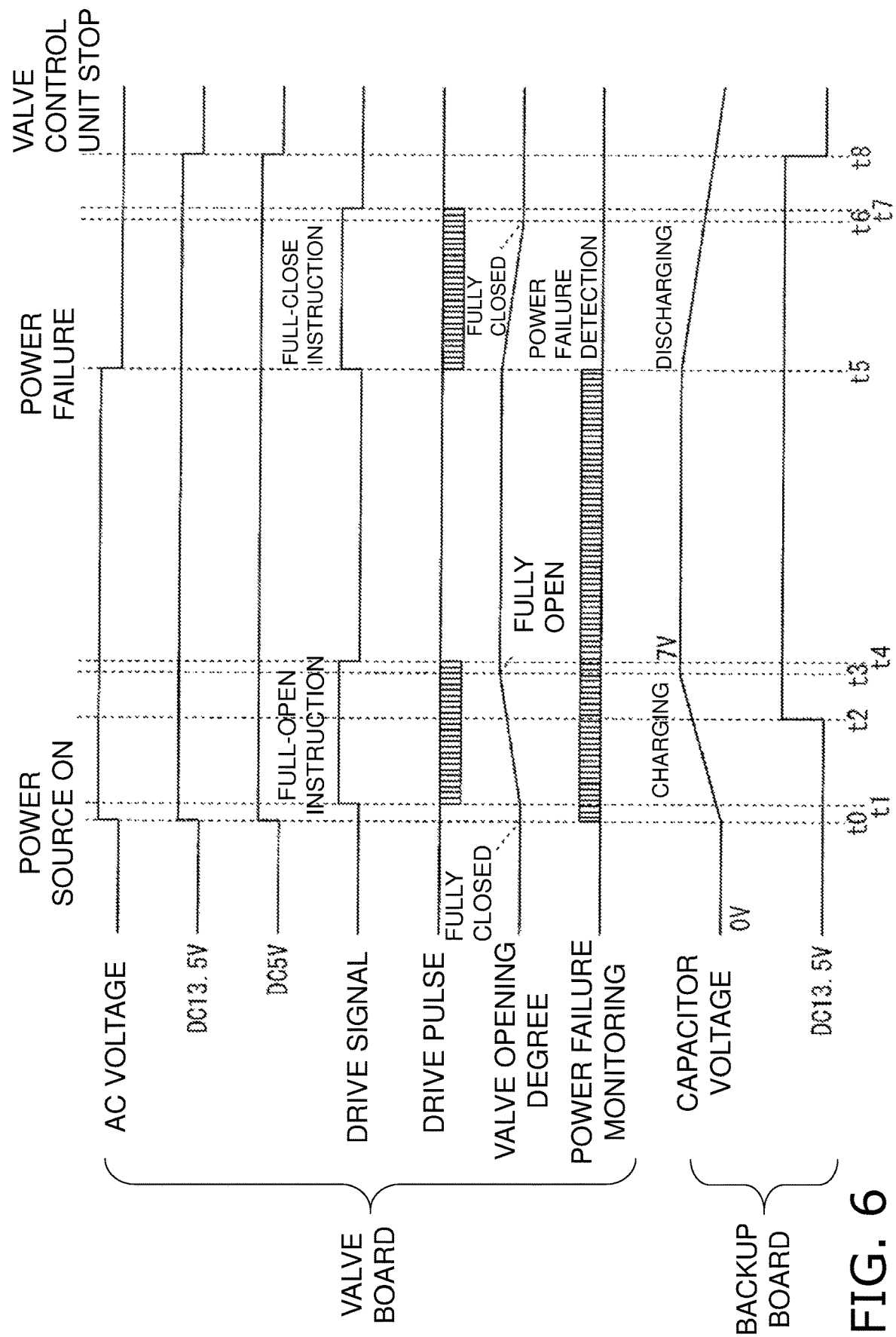
FIG. 6 is a time chart illustrating operation of each unit when a power failure occurs from a normal state of an AC power source.

FIG. 6 is a time chart illustrating operation of each unit when a power failure occurs from a normal state of the AC power source PS. The figure represents, in order from the top, an AC voltage, the presence or absence of 13.5 V DC output, the presence or absence of 5 V DC output, a valve drive signal, a drive pulse output from the valve drive circuit 1322 (FIG. 3), an opening degree of the valve, and power failure monitoring by the power failure detection circuit 1325 (FIG. 3), of the valve board 1032, and further represents a capacitor voltage of the electric double-layer capacitor 1334 (FIG. 3) and the presence or absence of 13.5 V DC output, of the backup board 1033.

When the AC voltage is turned on at time t0, 13.5 V DC and 5 V DC are output in the valve board 1032, and power failure monitoring by the power failure detection circuit 1325 is started. In the backup board 1033, the electric double-layer capacitor 1334 starts to be charged, and a capacitor voltage starts to rise. At time t1, a drive signal (a full-open instruction) for the valves 1017 and 1018 is output, and the fully closed valves 1017 and 1018 start to open. At time t2, 13.5 V DC of the backup board 1033 is enabled to be output.

At time t3, the valves 1017 and 1018 are fully open, and the capacitor voltage is to be 7 V with completion of charging. Thereafter, at time t4, the drive signals for the valves 1017 and 1018 are turned off, and the valve drive circuit 1322 (FIG. 3) stops outputting the drive pulse.

Next, if a power failure of the AC power source PS occurs at time t5, the power failure detection circuit 1325 detects the power failure, with reference to FIG. 3 as well. Although the output voltage of the AC and DC switching power source 1321 becomes 0 V, at the same time, 13.5 V DC is supplied from the backup board 1033 to the valve board 1032, from the electric double-layer capacitor 1334 (FIG. 4) via the boost circuit unit 1335 (FIG. 4) and the diode 1336 (FIG. 4). Therefore, 13.5 V DC and 5 V DC in the valve board 1032 are maintained, and the valve control unit 1324 can continue to operate. The valve control unit 1324 outputs a drive signal for instructing the valve drive circuit 1322 to fully close the valves 1017 and 1018. In response to this, the valve drive circuit 1322 outputs a drive pulse and starts to close the valves 1017 and 1018.

Thereafter, while the capacitor voltage gradually decreases, 13.5 V DC is maintained by the boost circuit unit 1335. At time t6, the valves 1017 and 1018 are fully closed. Thereafter, at time t7, the drive signals for the valves 1017 and 1018 are turned off, and the valve drive circuit 1322 stops outputting the drive pulse.

At time t8 when the capacitor voltage further decreases, the boost circuit unit 1335 can no longer output 13.5 V DC, and 13.5 V DC sent to the valve board 1032 and 5 V DC based on this 13.5 V DC become both 0 V. At this point, the microcomputer of the valve control unit 1324 stops operating.

(2) Second Embodiment

Figure 7:
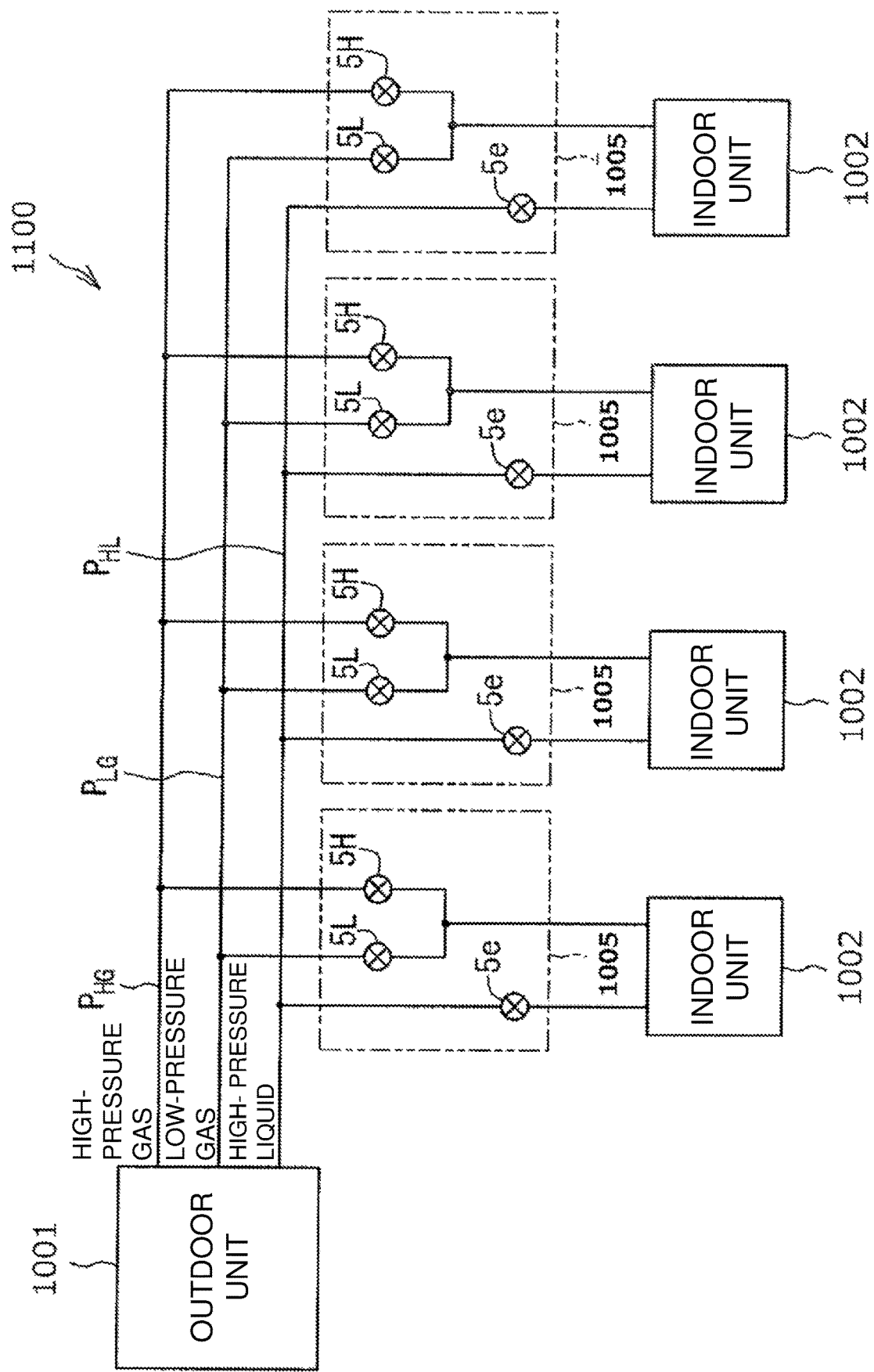
FIG. 7 is a diagram illustrating an example of a configuration in the case where the air conditioner is of simultaneous cooling and heating.

FIG. 7 is a diagram illustrating an example of a configuration in a case where an air conditioner 1100 is of simultaneous cooling and heating.

In the figure, from an outdoor unit 1001 of simultaneous cooling and heating, a plurality of (here four) flow path switching units 1005 are connected via a high-pressure gas pipe $P_{HG}$ through which a high-pressure gas refrigerant flows, a low-pressure gas pipe $P_{LG}$ through which a low-pressure gas refrigerant flows, and a high-pressure liquid pipe $P_{HL}$ through which a high-pressure liquid refrigerant flows. Further, an indoor unit 1002 is connected to each of these flow path switching units 1005. The flow path switching unit 1005 and the indoor unit 1002 form a refrigerant circuit that shares the outdoor unit 1001. Note that, although the four flow path switching units 1005 and the indoor unit 1002 are illustrated here, the number is merely an example for convenience of illustration.

Each of the flow path switching units 1005 includes an electric valve 5H connected to the high-pressure gas pipe $P_{HG}$, an electric valve 5L connected to the low-pressure gas pipe $P_{LG}$, and an electric valve 5e connected to the high-pressure liquid pipe $P_{HL}$.

The air conditioner 1100 of simultaneous cooling and heating described above can cause any indoor unit 1002 to perform an air conditioning (cooling or heating) operation as a use-side unit under the outdoor unit 1001 common as a heat source-side unit. The flow path switching unit 1005 can also cause some of the indoor units 1002 to perform cooling and other indoor units 1002 to perform heating. Specifically, controlling opening and closing of the electric valves 5H and 5L enables the refrigerant flow path to be switched. Further, controlling an opening degree of the electric valve 5e as necessary enables adjustment of the flow rate of a refrigerant flowing through a heat exchanger in the indoor unit 1002. Further, the electric valves 5H, 5L, and 5e in the flow path switching unit 1005 can also be used as shutoff valves. Therefore, the valve kit 1031 (FIG. 3) can also be provided together with the flow path switching unit 1005.

Figure 8:
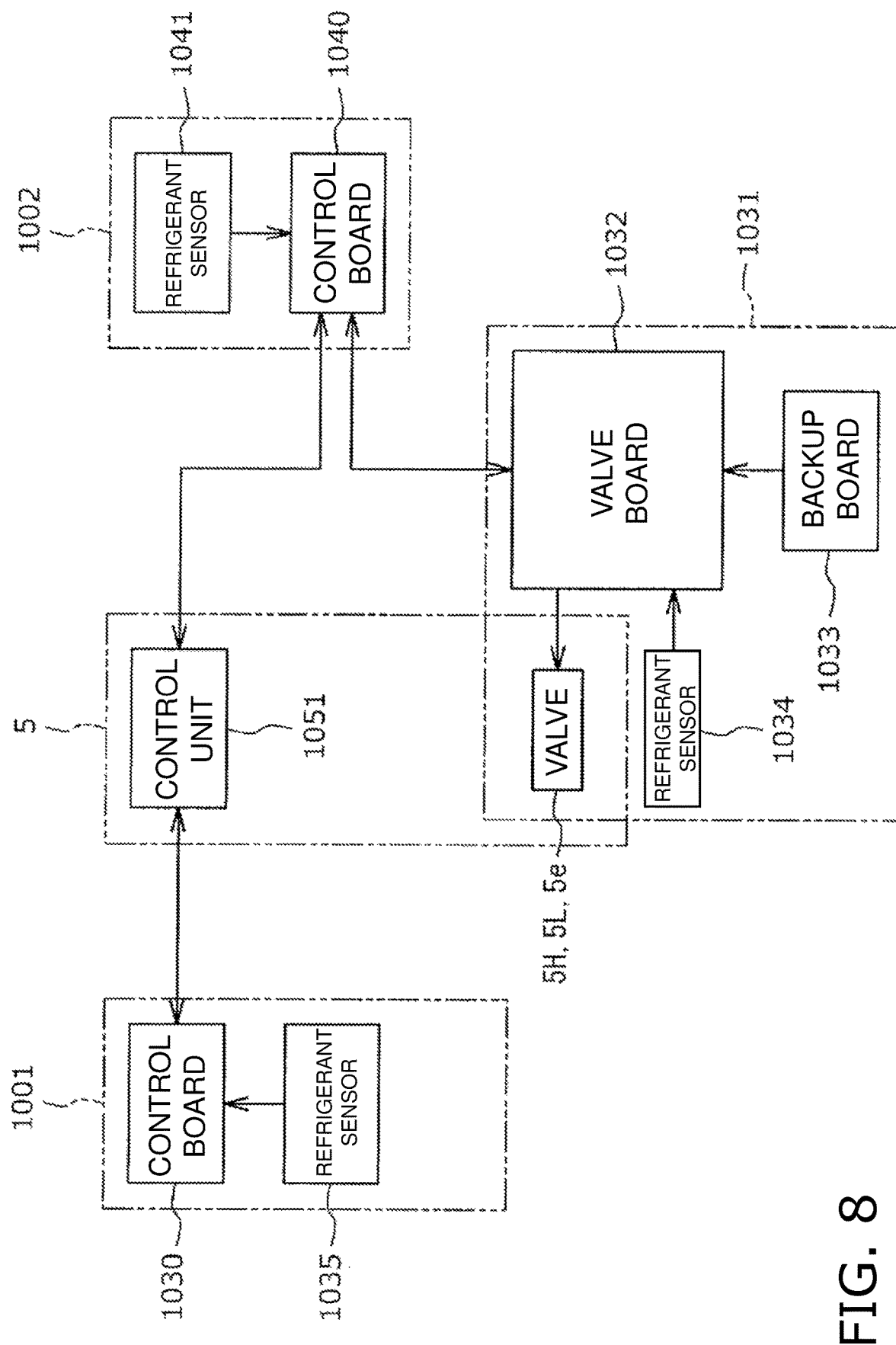
FIG. 8 is an electrical connection diagram in the air conditioner provided with a flow path switching unit.

FIG. 8 is an electrical connection diagram of the air conditioner provided with the flow path switching unit 1005.

In FIG. 8, the flow path switching unit 1005 includes a control unit 1051 on which a microcomputer is mounted, and the valves 5H, 5L, and 5e. Other components are similar to those of the first embodiment (FIG. 2), and the components denoted by the same reference numbers have similar functions. However, the valve kit 1031 is provided together with the flow path switching unit 1005 near the indoor unit 1002, and the valve board 1032 can communicate with the control board 1040 of the indoor unit 1002. The control board 1040 can communicate with the control unit 1051 of the flow path switching unit 1005, and with the control board 1030 of the outdoor unit 1001 via the control unit 1051.

The valve kit 1031 of FIG. 8 has a circuit similar to that of the first embodiment, and can fully close the valves 5H, 5L, and 5e with a voltage provided from the backup board 1033 at a time of power failure.

(3) Summary of First Embodiment and Second Embodiment

A summary of the above disclosure can be expressed in a generalized manner as follows.

This disclosure relates to a heat pump device including a refrigerant circuit, such as the air conditioner 1100 and other. The heat pump device includes: the valves 1017 and 1018 (or 5H, 5L, and 5e) provided on the refrigerant circuit and configured to maintain an opening degree during non-energization; the valve drive circuit 1322 configured to cause operation of the valves; the valve control unit 1324 configured to control the valve drive circuit 1322; and the power source circuit PW configured to supply a power source to the valve drive circuit 1322. The power source circuit PW includes: the first power source circuit unit P1 configured to receive power source supply from the outside to generate a DC voltage; and the second power source circuit unit P2 for backup configured to receive power source supply from the outside to store power in the capacitor (the electric double-layer capacitor 1334), and connect the capacitor in parallel to the first output electric path L1 of the first power source circuit unit P1.

In the heat pump device described above, a power source supply system in the power source circuit PW includes two systems, the first power source circuit unit P1 and the second power source circuit unit P2 including a capacitor. When the power source supply from the outside is lost due to a power failure, the first power source circuit unit P1 cannot supply power for closing the valve, but the valve can be closed by discharging the capacitor of the second power source circuit unit P2. Therefore, at a time of power failure, the valve can be closed in preparation for refrigerant leakage. Even when refrigerant leakage is detected at substantially the same time as the power failure, the valve can be closed.

The capacitor is required to have a capacity to store an amount of electricity required to fully close the valve from fully open. In this case, even if a power failure occurs when the valve is fully open, the valve can be fully closed from there.

The refrigerant circuit includes the gas-side refrigerant pipe and the liquid-side refrigerant pipe, the valve has the gas-side valve 1018 (5H, 5L) and the liquid-side valve 1017 (5e), and the capacitor has a capacity to store the amount of electricity required to fully close each of the valves from fully open.

In this case, even if a power failure occurs when the valve is fully open, the valves each can be fully closed from there.

The valve control unit 1324 may cause each of the valves 1017 and 1018 (or 5H, 5L, and 5e) to perform the close operation in order from any one of them.

In this case, since a maximum current value can be suppressed as compared with the case of causing a plurality of valves to perform the close operation at the same time, a voltage drop at that time can also be suppressed. This increases a possibility that at least one valve caused to perform the close operation first can be fully closed, even if the amount of electricity of the capacitor is not sufficient.

The heat pump device may include the refrigerant sensor 1034 configured to detect refrigerant leakage. When the refrigerant sensor 1034 detects refrigerant leakage, the valve control unit 1324 may cause operation of the valve drive circuit 1322 to close the valves 1017 and 1018 in a state where the capacitor is charged.

This allows the valve to be closed by discharging the charged capacitor, even if a power failure occurs after detection of refrigerant leakage.

The first power source circuit unit P1 and the valve drive circuit 1322 are mounted on a first board (the valve board 1032), and the second power source circuit unit P2 is mounted on a second board (the backup board 1033) different from the first board. In this case, it is easy to add, to a place where the existing first board is present, the second board on which the second power source circuit unit P2 is mounted.

The first board is provided with: the power failure detection circuit 1325 configured to detect a voltage input to the first power source circuit unit P1 or a voltage of a second output electric path L2, in which the voltage of the second output electric path L2 is insulated from the first output electric path L1 and output from the first power source circuit unit P1; and the valve control unit 1324 configured to control the valve drive circuit 1322. Then, in accordance with power failure detection by the power failure detection circuit 1325, the valve control unit 1324 outputs a command to close the valve. Thus, the valve can be reliably closed in accordance with power failure detection.

The second power source circuit unit P2 includes: the rectification unit 1331 for a direct current from an alternating current; the switching power source unit 1332 configured to step down an output voltage of the rectification unit 1331 to a predetermined DC voltage; the charge circuit unit 1333 configured to perform from constant current charging to constant voltage charging based on an output of the switching power source unit 1332; the electric double-layer capacitor 1334 connected to the charge circuit unit 1333; the boost circuit unit 1335 configured to boost an output voltage of the electric double-layer capacitor 1334 to a predetermined DC voltage; and the diode 1336 provided on a positive-side electric path at an output end of the boost circuit unit 1335 and having forward direction in a direction connecting from the positive-side electric path to the first power source circuit unit P1.

According to such a circuit configuration of the second power source circuit unit P2, the electric double-layer capacitor 1334 is charged via the rectification unit 1331, the switching power source unit 1332, and the charge circuit unit 1333. When there is an output voltage of the first power source circuit unit P1, the electric double-layer capacitor 1334 is not discharged due to reverse blocking of the diode 1336, and electric charges are stored in a full charge state. When the output voltage of the first power source circuit unit P1 is lost due to a power failure, the output voltage of the electric double-layer capacitor 1334 is supplied to the valve drive circuit 1322 via the boost circuit unit 1335 and the diode 1336.

The indoor unit 1002 includes the remote controller 1042 to perform an operation manipulation, and the remote controller 1042 includes the display unit 1042d configured to display information related to an open or closed state of the valve.

In this case, the open or closed state of the valve can be confirmed on the display unit 1042d of the remote controller 1042.

The heat pump device includes a main control unit (the control board 1030) configured to control a refrigeration cycle operation, and the main control unit (the control board 1030) can be made to perform the refrigeration cycle operation only when the valve control unit 1324 can communicate with the main control unit (the control board 1030).

In this case, it is possible to implement an interlock function of not operating the heat pump device when communication cannot be performed.

The valve kit 1031 includes the valve board 1032 and the backup board 1033. The valve board 1032 includes: the valves 1017 and 1018 (5H, 5L, and 5e) provided on the refrigerant circuit and configured to maintain an opening degree during non-energization; and the valve drive circuit 1322 configured to cause operation of the valve, and the first power source circuit unit P1 configured to receive power source supply from the outside to generate a DC voltage to supply to the valve drive circuit 1322. The backup board 1033 includes the second power source circuit unit P2 configured to receive power source supply from the outside to store power in the capacitor, and connect the capacitor in parallel to the first output electric path L1 of the first power source circuit unit P1.

In the valve kit described above, a power source supply system to the valve drive circuit 1322 includes two systems, the first power source circuit unit P1 and the second power source circuit unit P2 including the capacitor. When the power source supply from the outside is lost due to a power failure, the first power source circuit unit P1 cannot supply power for closing the valve, but the valves 1017 and 1018 (5H, 5L, and 5e) can be closed by discharging the capacitor of the second power source circuit unit P2. Therefore, at a time of power failure, the valve can be closed in preparation for refrigerant leakage. Even when refrigerant leakage is detected at substantially the same time as the power failure, the valve can be closed.

The valve kit may be provided in a refrigerant pipe that connects a heat source-side unit and a use-side unit to each other.

In this case, disposing the valve kit enables refrigerant leakage to be easily blocked between the heat source-side unit and the use-side unit.

(4) Modification of First Embodiment and Second Embodiment

Note that at least some of the above-described embodiments may be freely combined with each other.

Although the air conditioner has been described as an example in each of the above-described embodiments, the circuit configuration in which the valve is fully closed by the backup power source can be applied to general heat pump devices having a refrigerant circuit.

(5) Third Embodiment

Figure 9:
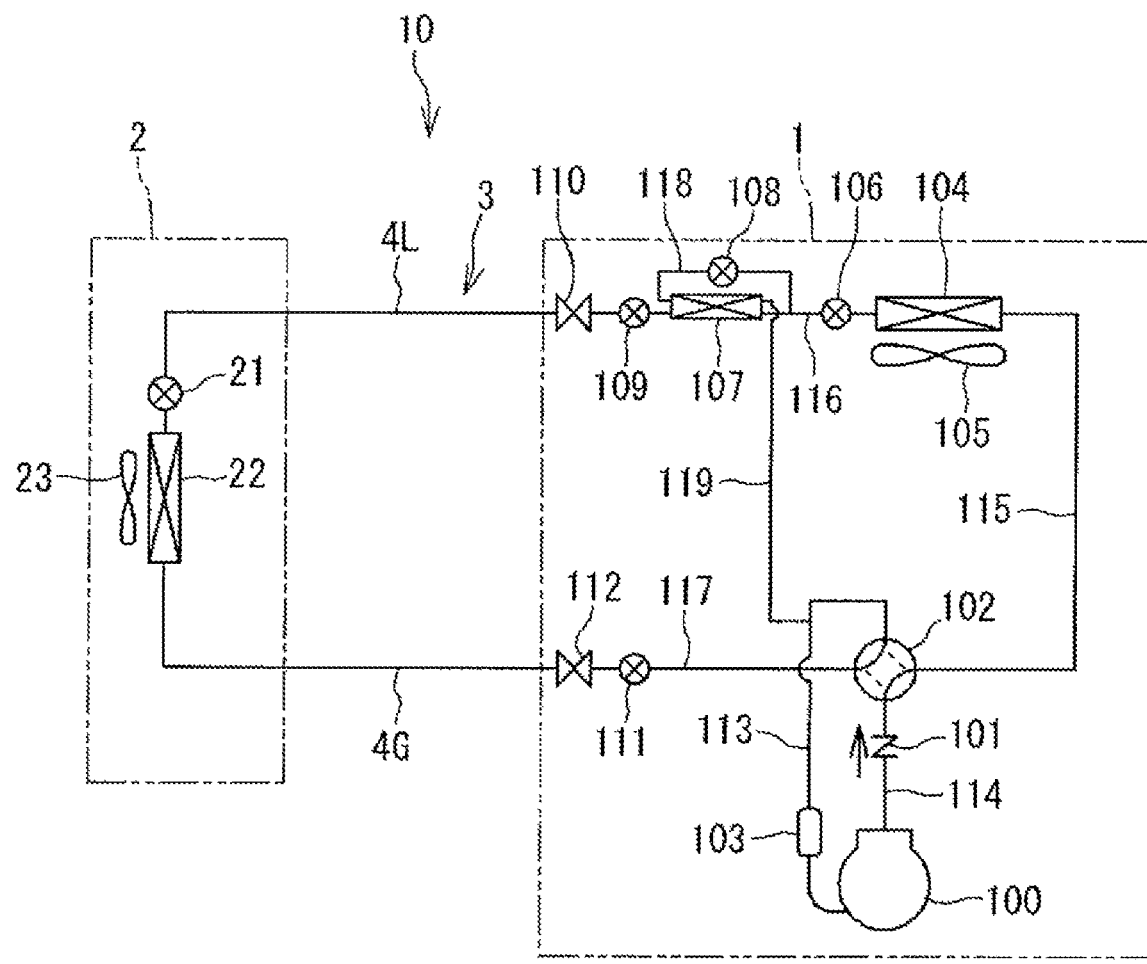
FIG. 9 is a schematic configuration diagram of the refrigerant circuit of the air conditioner.

FIG. 9 is a schematic configuration diagram of a refrigerant circuit of an air conditioner 10. The air conditioner 10 is a device that performs cooling or heating in a building by a vapor compression refrigeration cycle. The air conditioner 10 is configured by connecting an outdoor unit 1 and an indoor unit 2 by a refrigerant circuit 3. Although only one indoor unit 2 is illustrated, a plurality of indoor units 2 may be connected in parallel in accordance with the scale of equipment. As a refrigerant, for example, R32 is used.

(5-1) Outdoor Unit

The outdoor unit 1 is installed outdoor or outside a room in a building. The outdoor unit 1 is connected to the indoor unit 2 via a liquid-refrigerant connection pipe 4L and a gas-refrigerant connection pipe 4G. The outdoor unit 1 includes a compressor 100, a check valve 101, a four-way switching valve 102, an accumulator 103, an outdoor heat exchanger 104, an outdoor fan 105, an outdoor expansion valve 106, a refrigerant cooler 107, a bypass expansion valve 108, a first control valve 109, a liquid-side shutoff valve 110, a second control valve 111, and a gas-side shutoff valve 112.

The four-way switching valve 102 can mutually switch between a heat radiation operation state (hereinafter, referred to as a first state) in which the outdoor heat exchanger 104 functions as a radiator for the refrigerant, and an evaporation operation state (hereinafter, referred to as a second state) in which the outdoor heat exchanger 104 functions as an evaporator for the refrigerant. The four-way switching valve 102 and a suction side of the compressor 100 are connected via a suction refrigerant pipe 113. The suction refrigerant pipe 113 is provided with the accumulator 103 that temporarily accumulates a refrigerant suctioned into the compressor 100. The compressor 100 is a device for compressing the refrigerant, and for example, a device having a sealed structure such as a rotary type or a scroll type is used.

The check valve 101 for prevention of a backflow is provided in between a discharge refrigerant pipe 114 connecting a discharge side of the compressor 100 and the four-way switching valve 102. The four-way switching valve 102 and a gas-side end of the outdoor heat exchanger 104 are connected by a first outdoor gas refrigerant pipe 115. A liquid-side end of the outdoor heat exchanger 104 and the liquid-refrigerant connection pipe 4L are connected via an outdoor liquid-refrigerant pipe 116.

At a connecting part between the outdoor liquid-refrigerant pipe 116 and the liquid-refrigerant connection pipe 4L, the liquid-side shutoff valve 110 is provided. The four-way switching valve 102 and the gas-refrigerant connection pipe 4G are connected via a second outdoor gas refrigerant pipe 117. At a connecting part between the second outdoor gas refrigerant pipe 117 and the gas-refrigerant connection pipe 4G, the second control valve 111, which is an electric valve, and the gas-side shutoff valve 112 are provided. The liquid-side shutoff valve 110 and the gas-side shutoff valve 112 are valves to be manually opened and closed, for example.

In the first state described above, the four-way switching valve 102 connects the discharge side of the compressor 100 and a gas side of the outdoor heat exchanger 104 (a state of the four-way switching valve 102 indicated by a solid line in FIG. 9). In the second state, the four-way switching valve 102 connects the suction side of the compressor 100 and the gas side of the outdoor heat exchanger 104 (a state of the four-way switching valve 102 indicated by a broken line in FIG. 9).

During the cooling operation, the four-way switching valve 102 is switched to the first state. During the heating operation, the four-way switching valve 102 is switched to the second state.

The outdoor fan 105 supplies outdoor air as a cooling source or a heating source of the refrigerant flowing through the outdoor heat exchanger 104, to the outdoor heat exchanger 104.

The outdoor expansion valve 106 and the first control valve 109 are provided on the outdoor liquid-refrigerant pipe 116. The outdoor expansion valve 106 is an electric valve that decompresses the refrigerant during the heating operation, and is provided at a portion of the outdoor liquid-refrigerant pipe 116 between the outdoor heat exchanger 104 and the first control valve 109. The first control valve 109 is an electric valve, and is fully open during normal operation. The first control valve 109 is provided at a portion of the outdoor liquid-refrigerant pipe 116 closer to the liquid-refrigerant connection pipe 4L.

To the refrigerant cooler 107, a first bypass pipe 118 having the bypass expansion valve 108 interposed in between is connected. Further, to the refrigerant cooler 107, a second bypass pipe 119 is connected. The second bypass pipe 119 is connected to the suction refrigerant pipe 113.

A part of the refrigerant flowing through the outdoor liquid-refrigerant pipe 116 is split from a portion between the outdoor expansion valve 106 and the refrigerant cooler 107, and sent to an inlet (left side in FIG. 9) of the refrigerant cooler 107 on the first bypass pipe 118 side. The bypass expansion valve 108 of the first bypass pipe 118 adjusts the flow rate of the refrigerant flowing through the refrigerant cooler 107, while decompressing the refrigerant flowing through the first bypass pipe 118. The bypass expansion valve 108 is an electric valve.

The second bypass pipe 119 sends the refrigerant from an outlet of the refrigerant cooler 107 on the first bypass pipe 118 side to the suction refrigerant pipe 113. The second bypass pipe 119 is connected to the accumulator 103 via the suction refrigerant pipe 113.

The refrigerant cooler 107 is a heat exchanger that cools the refrigerant flowing through a portion of the outdoor liquid-refrigerant pipe 116 on the outdoor heat exchanger 104 side from the first control valve 109, by using the refrigerant flowing through the first bypass pipe 118. In the refrigerant cooler 107, the refrigerant flowing through the first bypass pipe 118 and the refrigerant flowing through the outdoor liquid-refrigerant pipe 116 become opposite flows during the cooling operation.

(5-2) Indoor Unit

The indoor unit 2 is installed inside a room in a building. As described above, the indoor unit 2 is connected to the outdoor unit 1 via the liquid-refrigerant connection pipe 4L and the gas-refrigerant connection pipe 4G, to form a part of the refrigerant circuit 3.

The indoor unit 2 mainly has an indoor expansion valve 21 and an indoor heat exchanger 22. Among refrigerant pipes connected to the indoor heat exchanger 22, one provided with the indoor expansion valve 21 is connected to the liquid-refrigerant connection pipe 4L, and opposite one is connected to the gas-refrigerant connection pipe 4G. The indoor expansion valve 21 is an electric valve configured to adjust the flow rate of refrigerant flowing through the indoor heat exchanger 22, while decompressing the refrigerant. The indoor heat exchanger 22 functions as a refrigerant evaporator to cool indoor air or functions as a refrigerant radiator to heat indoor air. An indoor fan 23 sucks indoor air into the indoor unit 2, exchanges heat with the refrigerant in the indoor heat exchanger 22, and then supplies the indoor air as supply air to the room.

(5-3) Electrical Connection Diagram Related to Control Valve

The outdoor expansion valve 106, the bypass expansion valve 108, the first control valve 109, and the second control valve 111 described above are driven by pulses. An opening or closing amount by one pulse is determined, and an opening degree can be adjusted in accordance with the number of pulses to be given. For example, applying 3000 pulses causes switching from fully open to fully closed or vice versa.

In the refrigerant circuit 3 configured as described above, the first control valve 109 and the second control valve 111 at a terminal end of the outdoor unit 1 are particularly important valves for sealing the refrigerant. Then, these valves will be hereinafter simply collectively referred to as control valves 109 and 111.

Figure 10:
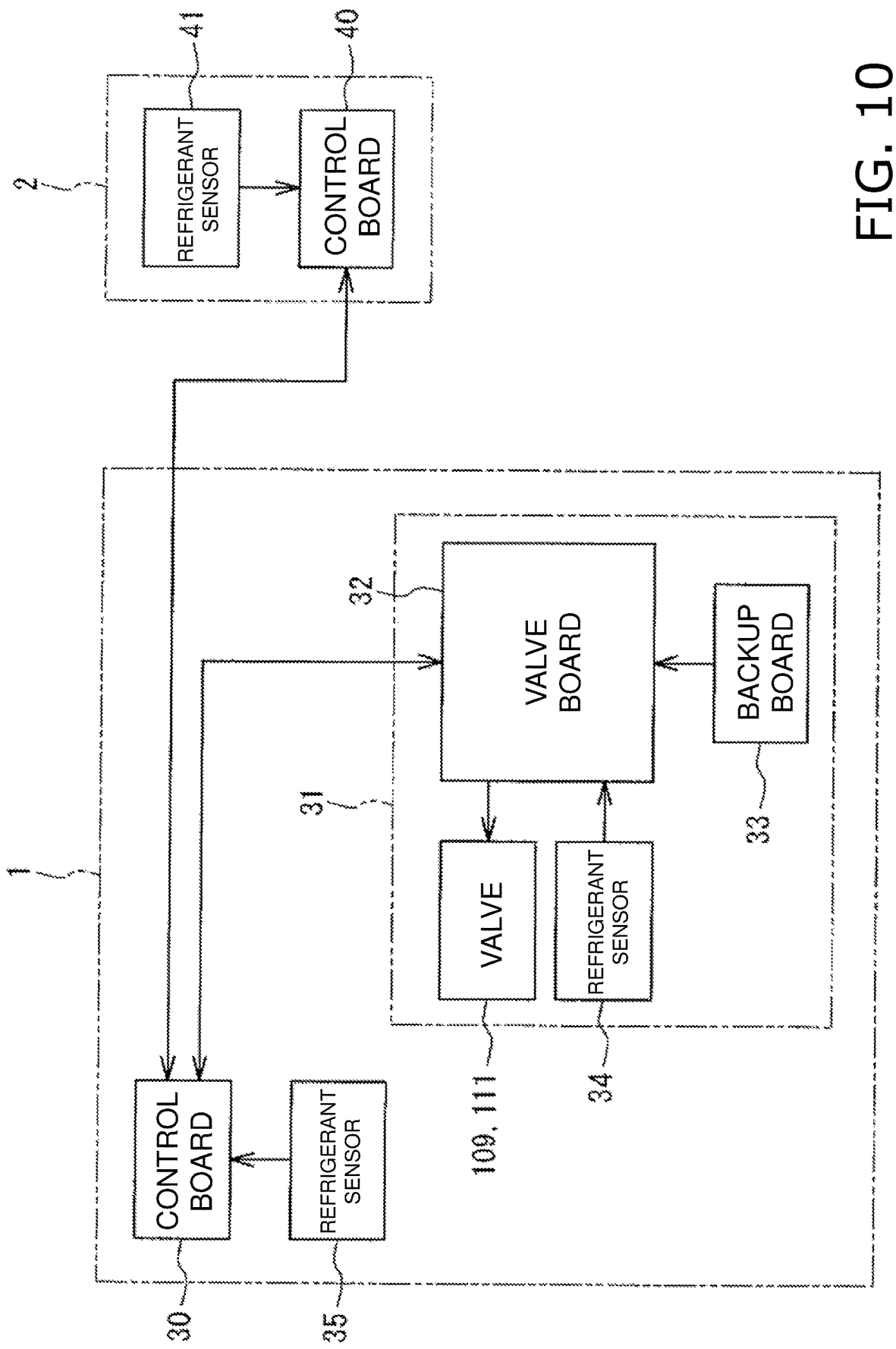
FIG. 10 is an electrical connection diagram related to a control valve in the air conditioner.

FIG. 10 is an electrical connection diagram related to the control valves 109 and 111 in the air conditioner 10. In FIG. 10, the outdoor unit 1 includes a control board 30, a valve board 32, a backup board 33, and refrigerant sensors 34 and 35, in addition to the control valves 109 and 111. The control board 30 is a main control unit that is mounted with a microcomputer, and controls the refrigeration cycle operation of the entire air conditioner. The valve board 32 is also mounted with a microcomputer. The valve board 32, the backup board 33, the refrigerant sensor 34, and the control valves 109 and 111 constitute a valve kit 31 specialized for control of the control valves 109 and 111. The control board 30 and the valve board 32 can communicate with each other.

When the refrigerant leaks, the refrigerant sensor 34 detects the refrigerant leakage and transmits a detection signal to the valve board 32. Similarly, when the refrigerant leaks, the refrigerant sensor 35 detects the refrigerant leakage and transmits a detection signal to the control board 30. Although this is an example in which the two refrigerant sensors 34 and 35 are provided, only one refrigerant sensor may be provided to transmit the detection signal to both the control board 30 and the valve board 32.

The indoor unit 2 includes a control board 40 on which a microcomputer is mounted, and a refrigerant sensor 41 configured to detect refrigerant leakage in the indoor unit 2 when the refrigerant leakage occurs. The control board 40 can communicate with the control board 30 of the outdoor unit 1. The refrigerant sensor may be provided only in the indoor unit 2 or only in the outdoor unit 1.

(5-4) Details of Circuit Related to Control Valve

Figure 11:
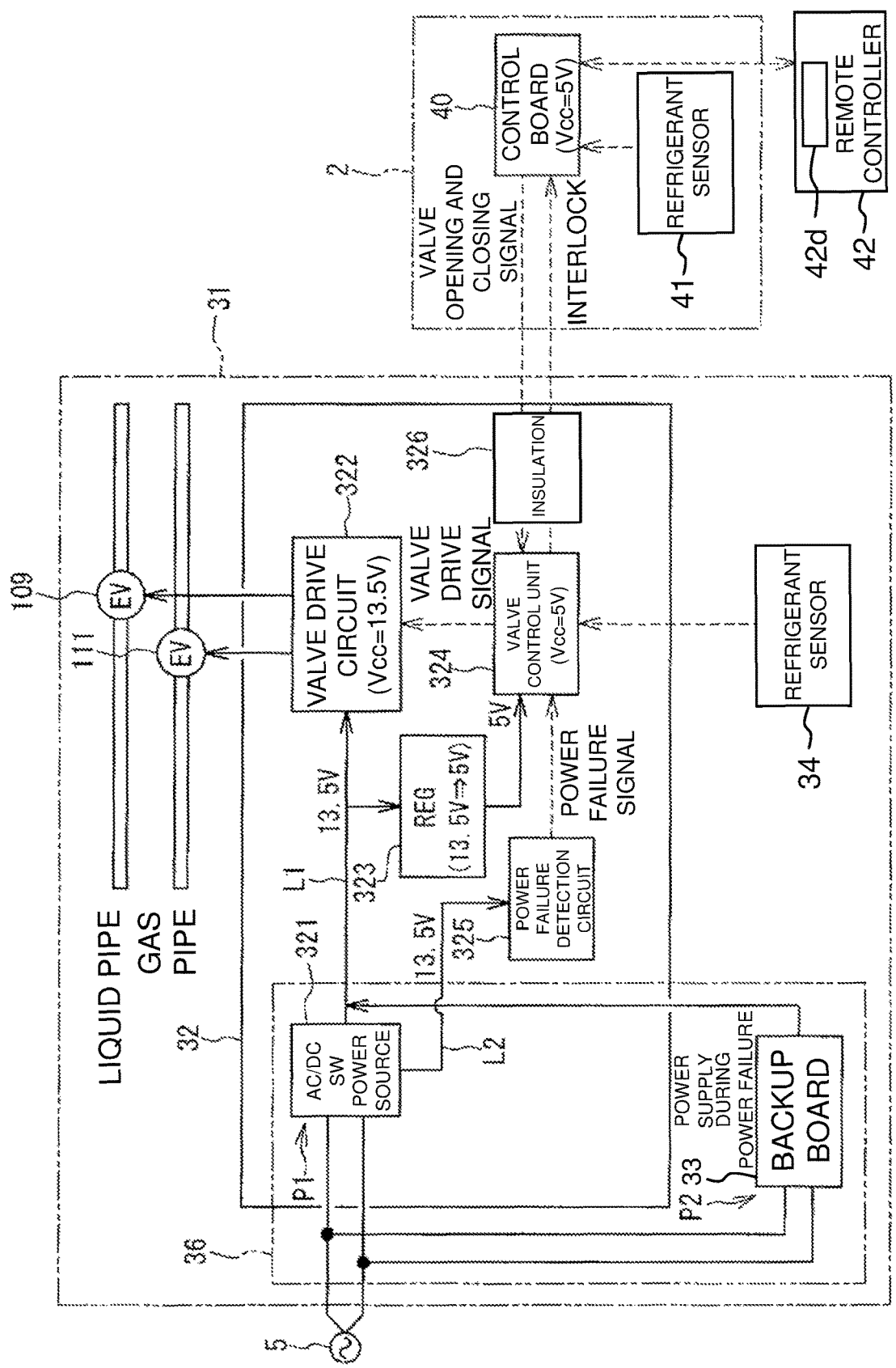
FIG. 11 is a circuit diagram illustrating a valve kit in more detail.

FIG. 11 is a circuit diagram illustrating the valve kit 31 in more detail. A solid line in a circuit in the figure represents a power source line, and a broken line represents a signal line. To the valve board 32, an AC voltage (for example single-phase 230 V±10% AC) is supplied from an external AC power source 5. Note that, for the AC voltage, two-phase two wires may be extracted from a three-phase AC power source. Similarly, an AC voltage is supplied to the backup board 33.

The valve board 32 includes an AC and DC switching power source 321, a valve drive circuit 322, a regulator 323, a valve control unit 324, a power failure detection circuit 325, and an insulation circuit 326. The AC and DC switching power source 321 converts 230 VAC to a DC voltage (13.5 V DC in the present embodiment). The output of 13.5 V DC is output while two systems are insulated from each other. A first output electric path L1 that is one of the two systems is connected to the valve drive circuit 322 and the regulator 323, and a second output electric path L2 that is another one of the two systems is connected to the power failure detection circuit 325.

The valve drive circuit 322 can open and close the control valves 109 and 111 based on an input voltage of 13.5 V DC and a valve drive signal from the valve control unit 324. The regulator 323 steps down the 13.5 V DC (steps down to 5 V DC in the present embodiment) and supplies a power source voltage (Vcc) to the valve control unit 324. The valve control unit 324 is mounted with a microcomputer.

The power failure detection circuit 325 detects a power failure when the voltage of 13.5 V DC supplied from the AC and DC switching power source 321 decreases.

When detecting the power failure, the power failure detection circuit 325 transmits a power failure signal to the valve control unit 324. Since the power failure detection circuit 325 itself also loses its own control power source voltage due to the power failure, the power failure signal is a zero signal that changes from an H level to an L level, or is a contact state change signal when excitation changes to non-excitation in a case of a relay.

When detecting refrigerant leakage, the refrigerant sensor 34 transmits a detection signal to the valve control unit 324. Also on the indoor unit 2 side, when detecting refrigerant leakage, the refrigerant sensor 41 transmits a detection signal to the valve control unit 324 via the control board 40. The control board 40 is connected to a remote controller 42. The remote controller 42 includes a display unit 42d configured to display information related to an open or closed state of the control valves 109 and 111.

Between the control board 40 of the indoor unit 2 and the valve control unit 324 of the outdoor unit 1, the insulation circuit 326 that insulates a signal voltage and relays a signal is provided. Although not illustrated in FIG. 11, the valve control unit 324 of the valve board 32 and the control board 40 of the indoor unit 2 can communicate with the control board 30 (FIG. 10) of the outdoor unit 1 as described above.

In the case where the AC power source 5 is normally supplying a voltage, when an operation start manipulation of the air conditioner is performed from the remote controller 42, the valve control unit 324 transmits a drive signal to the valve drive circuit 322. The valve drive circuit 322 having received the drive signal opens the control valves 109 and 111. Further, an operation start command is transmitted from the control board 40 of the indoor unit 2 to the control board 30 of the outdoor unit 1, and the operation of the air conditioner is started.

When the refrigerant sensor 34 or the refrigerant sensor 41 detects refrigerant leakage during the operation of the air conditioner, the control board 30 (FIG. 10) is notified of the refrigerant leakage from the valve control unit 324 or the control board 40, and the operation of the air conditioner is stopped. The valve control unit 324 transmits a drive signal to the valve drive circuit 322 to fully close the control valves 109 and 111. The control board 30 (FIG. 10) of the outdoor unit 1 performs the refrigeration cycle operation only when communication with the valve control unit 324 is possible. This makes it possible to implement an interlock function of not operating the air conditioner when communication cannot be performed.

In the case where the AC power source 5 is normally supplying a voltage, when an operation stop manipulation of the air conditioner is performed from the remote controller 42, the operation of the air conditioner is stopped, but the control valves 109 and 111 remain open when there is no refrigerant leakage.

Even while the air conditioner is stopped, the AC power source 5 is active, which causes a voltage to be supplied to the valve board 32 and the backup board 33.

In the circuit configuration of the valve kit 31 described above, a power source circuit 36 configured to supply a power source (13.5 V DC) to the valve drive circuit 322 includes: a first power source circuit unit P1 configured to receive power source supply from the external AC power source 5 to generate a DC voltage (13.5 V DC); and a second power source circuit unit P2 configured to generate a DC voltage (13.5 V DC) by the backup board 33 configured to receive power source supply from the external AC power source 5. As will be described later, the second power source circuit unit P2 is a power source circuit unit for backup at a time of power failure, in which the power source circuit unit stores power in a power storage mounted on the backup board 33 and connects the power storage in parallel to the first output electric path L1 of the first power source circuit unit P1.

Note that output of the backup board 33 is not connected to the second output electric path L2 from the first power source circuit unit P1 (the AC and DC switching power source 321) to the power failure detection circuit 325. During a power failure, a backup voltage is supplied from the second power source circuit unit P2 to the first output electric path L1, but the voltage is not supplied to the second output electric path L2. Therefore, the voltage of the second output electric path L2 is lost during the power failure.

(5-5) Backup Board

Figure 12:
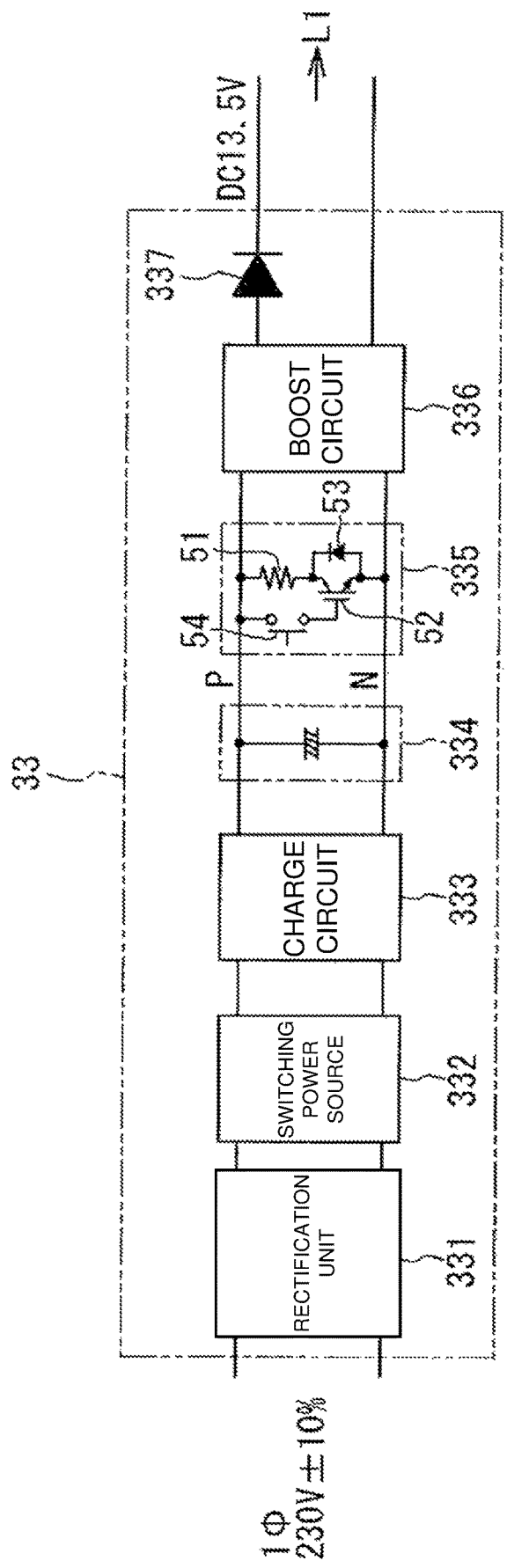
FIG. 12 is an internal circuit diagram of a backup board.

FIG. 12 is an internal circuit diagram of the backup board 33. The backup board 33 includes a rectification unit 331, a switching power source 332, a charge circuit 333, a power storage 334 that is an electrolytic capacitor or an electric double-layer capacitor, a discharge circuit 335, a boost circuit 336, and a diode 337. The rectification unit 331 rectifies and smooths single-phase 230 V AC (±10%) to a DC voltage. The switching power source 332 converts the DC voltage into a stable DC low voltage. The charge circuit 333 charges the power storage 334 based on the DC voltage provided from the switching power source 332. The power storage 334 has a large capacity of, for example, 82 farads.

The discharge circuit 335 includes: a discharge resistor 51 and a semiconductor switch 52 connected in series with each other between a P line and an N line drawn from both ends of the power storage 334; and a discharge switch 54 provided between a control electrode of the semiconductor switch 52 and the P line. The semiconductor switch has a diode 53 connected in antiparallel.

The discharge switch 54 is, for example, an automatic return push-button switch by manual operation, and is closed when an ON operation is performed, and is opened when the hand is released. When the discharge switch 54 is closed, the semiconductor switch 52 is turned on, and a current flows between the P line and the N line through the discharge resistor 51. When the discharge switch 54 is opened, the semiconductor switch 52 is turned off, and no current flows through the discharge resistor 51 due to reverse blocking of the diode 53. In a normal operation state where 230 V AC is supplied to the rectification unit 331, no discharge current flows through the discharge circuit 335.

A voltage between the P line and the N line is input to the boost circuit 336. The boost circuit 336 is a semiconductor obtained by integrating a boosting chopper into one chip, and boosts the DC voltage to 13.5 V. To a cathode of the diode 337, a potential of the first output electric path L1 in FIG. 11 is applied. To an anode of the diode 337, an output potential of the boost circuit 336 is applied. When the potential of the cathode is higher than the potential of the anode, the diode 337 is in a state of a reverse voltage, so that no current flows. When the potential of the anode is higher than the potential of the cathode, a forward voltage state is made, a voltage is supplied from the backup board 33 to the first output electric path L1, and a current flows.

Using the power storage 334 makes it possible to simplify a circuit and downsize a circuit board as compared with the case of using another auxiliary power source (a battery or the like). By using the power storage 334 that is a large-capacity electrolytic capacitor or an electric double-layer capacitor, it is possible to secure a large electrostatic capacity while further reducing the size of the board.

(5-6) Operation at Time of Power Failure

Figure 13:
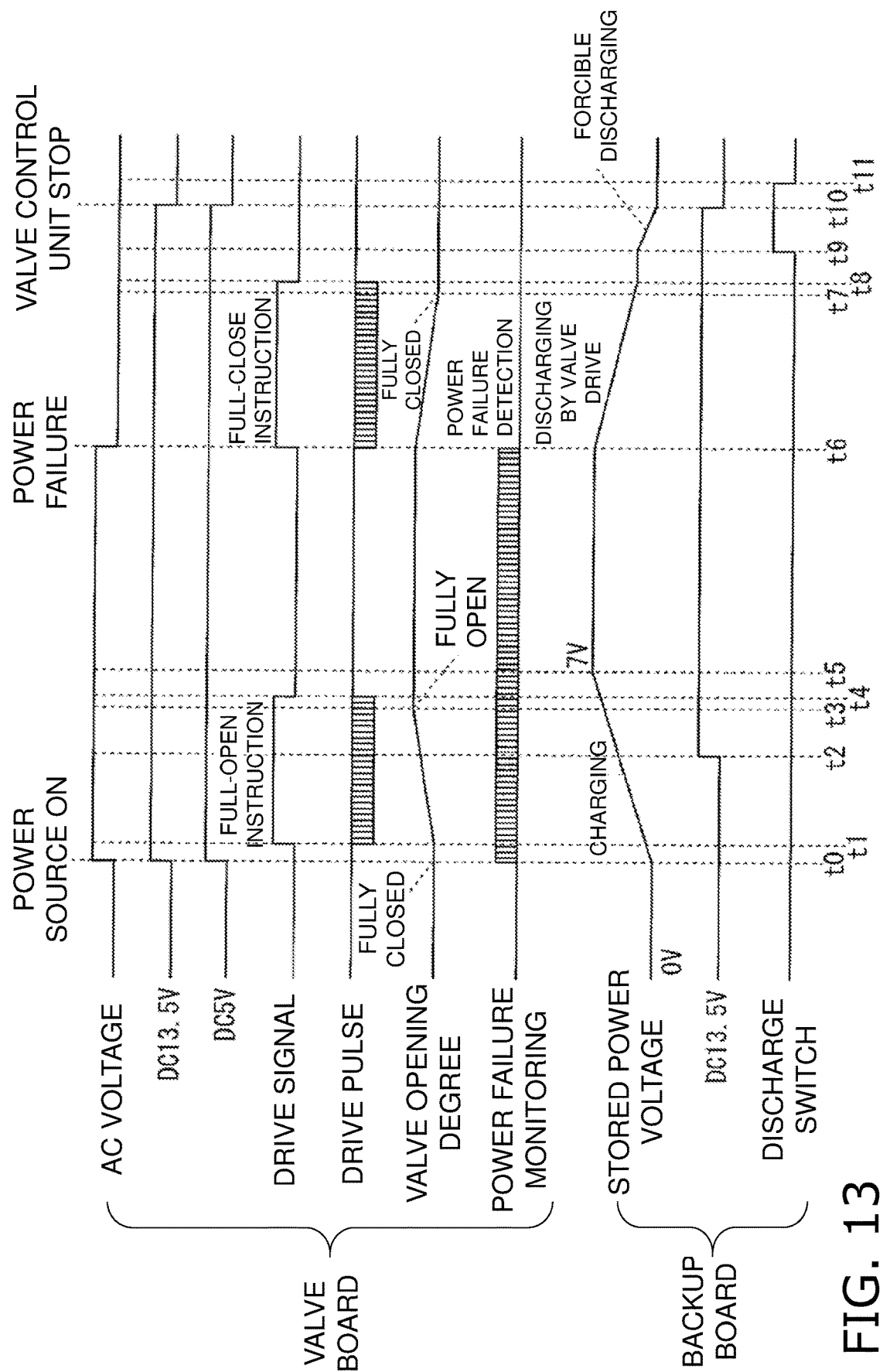
FIG. 13 is a time chart illustrating operation of each unit when a power failure occurs from a normal state of an AC power source (this also includes the case where the AC power source is shut off by an operation).

FIG. 13 is a time chart illustrating operation of each unit when a power failure occurs from a normal state of the AC power source 5 (FIG. 11) (this also includes the case where the AC power source 5 is shut off by an operation). Regarding the valve board 32 (FIG. 11), the figure represents, in order from the top, an AC voltage, the presence or absence of 13.5 V DC output, the presence or absence of 5 V DC output, a drive signal to the control valves 109 and 111 (FIG. 11), a drive pulse output from the valve drive circuit 322 (FIG. 11), a valve opening degree, and power failure monitoring by the power failure detection circuit 325 (FIG. 11), of the valve board 32. Regarding the backup board 33 (FIG. 11, FIG. 12), the figure represents a stored power voltage of the power storage 334 (FIG. 12), the presence or absence of 13.5 V DC output, and an operation (L level is open, H level is closed) of the discharge switch 54 (FIG. 12), of the backup board 33.

When the AC voltage is supplied at time t0, 13.5 V DC and 5 V DC are output in the valve board 32 (FIG. 11), and power failure monitoring by the power failure detection circuit 325 (FIG. 11) is started. In the backup board 33 (FIG. 11, FIG. 12), the power storage 334 (FIG. 12) starts to be charged, and the stored power voltage starts to rise. At time t1, a drive signal (a full-open instruction) of the control valves 109 and 111 (FIG. 11) is output, and a drive pulse is output. As a result, the fully closed control valves 109 and 111 start to open. At time t2, 13.5 V DC of the backup board 33 is enabled to be output.

At time t3, a valve opening degree becomes "fully open". At time t4 immediately after that, the drive signal and the drive pulse are stopped.

At time t5, the stored power voltage reaches, for example, an upper limit of 7 V. Thereafter, the same state continues as long as the normal operation continues.

Next, assuming that a power failure of the AC power source 5 (FIG. 11) occurs at time t6, the power failure detection circuit 325 (FIG. 11) detects the power failure. The output voltage of the AC and DC switching power source 321 (FIG. 11) becomes 0 V. At the same time, 13.5 V DC is supplied from the backup board 33 (FIG. 11, FIG. 12) to the first output electric path L1 (FIG. 11), from the power storage 334 (FIG. 12) via the boost circuit 336 (FIG. 12) and the diode 337 (FIG. 12).

As a result, in FIG. 11, 13.5 V DC in the first output electric path L1 and 5 V DC downstream thereof are maintained, and the valve control unit 324 can also continue to operate. The valve control unit 324 outputs a drive signal for instructing the valve drive circuit 322 to fully close the control valves 109 and 111. In response to this, the valve drive circuit 322 outputs a drive pulse and starts to close the control valves 109 and 111.

Thereafter, the stored power voltage gradually decreases due to discharge, but 13.5 V DC is maintained by the boost circuit 336 (FIG. 12). At time t7, the control valves 109 and 111 are fully closed. At time t8 immediately after that, the drive signals for the control valves 109 and 111 are turned off, and the valve drive circuit 322 stops outputting the drive pulse. At this time, electric charges of the power storage 334 still remain, and the stored power voltage is in a state of several volts.

Here, when an inspection worker turns on (closes) the discharge switch 54 (FIG. 12) at time t9, the semiconductor switch 52 is turned on, a current flows between the P line and the N line through the discharge resistor 51, and the remaining electric charges of the power storage 334 (FIG. 12) are rapidly discharged. At time t10 when the stored power voltage drops to near 0, the boost circuit 336 (FIG. 12) can no longer output 13.5 V DC, and 13.5 V DC sent to the valve board 32 (FIG. 11) and 5 V DC based on this 13.5 V DC both become 0 V. At this point, the microcomputer of the valve control unit 324 (FIG. 11) stops operating. The inspection worker opens the discharge switch 54 (FIG. 12) at time t11.

In this way, the inspection worker can discharge the electric charges remaining in the power storage 334 by the discharge circuit 335 at a time of power failure. Therefore, the voltage of the electric path (between the P line and the N line) connected to the power storage 334 can be lost by rapid discharge of the electric charges.

(5-7) Installation Location of Discharge Switch

Figure 14:
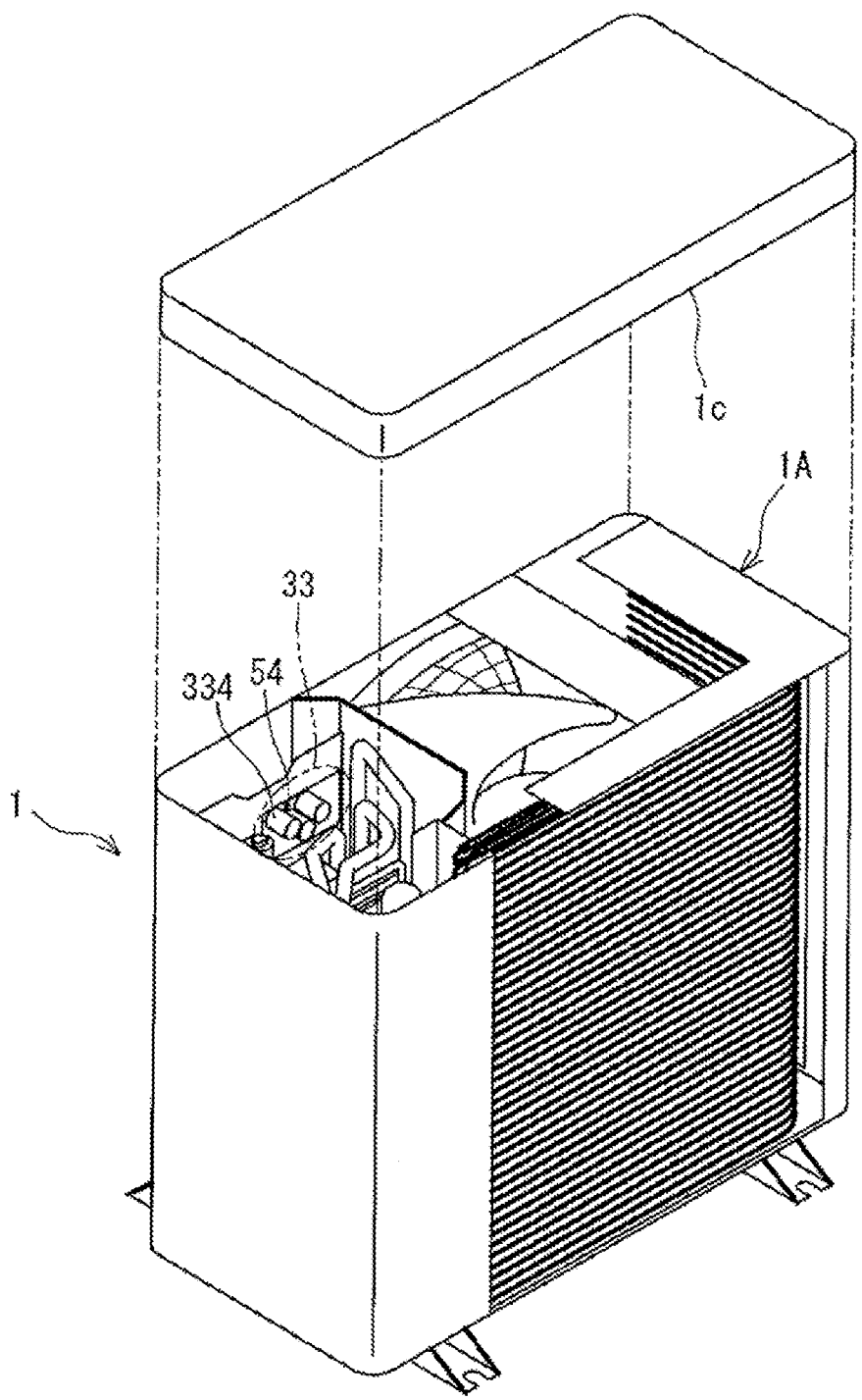
FIG. 14 is an example of a perspective view of an outdoor unit, illustrating a state in which an upper cover that is a part of a housing is removed.
Figure 15:
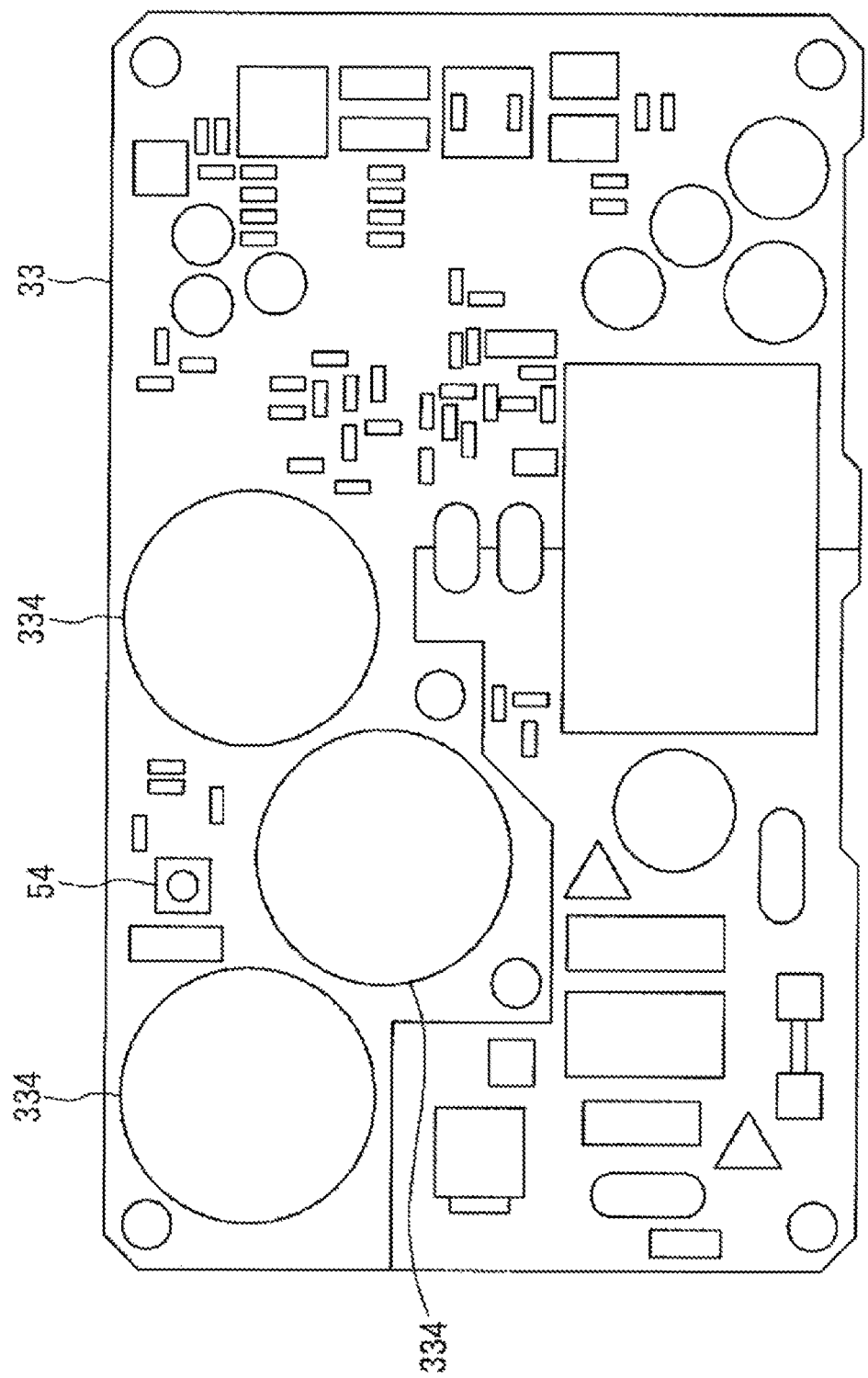
FIG. 15 is a view schematically illustrating an outer shape of a backup board.

FIG. 14 is an example of a perspective view of the outdoor unit 1, and illustrates a state in which an upper cover 1c that is a part of a housing 1A is removed. On a front left side, a horizontally long part of the backup board 33 is visible. FIG. 15 is a view schematically illustrating an outer shape of the backup board 33. The power storage 334 is, for example, a parallel body of such three electrolytic capacitors. In FIGS. 14 and 15, the discharge switch 54 is attached to the backup board 33. The inspection worker can easily find and operate the discharge switch 54 by removing the cover 1c.

(6) Fourth Embodiment

Next, a heat pump device according to a fourth embodiment will be described. Differences from the third embodiment are a part of circuits of a valve board 32 and a backup board 33 and an operation during a power failure. Other configurations are similar to those according to the third embodiment.

(6-1) Details of Circuit Related to Control Valve

Figure 16:
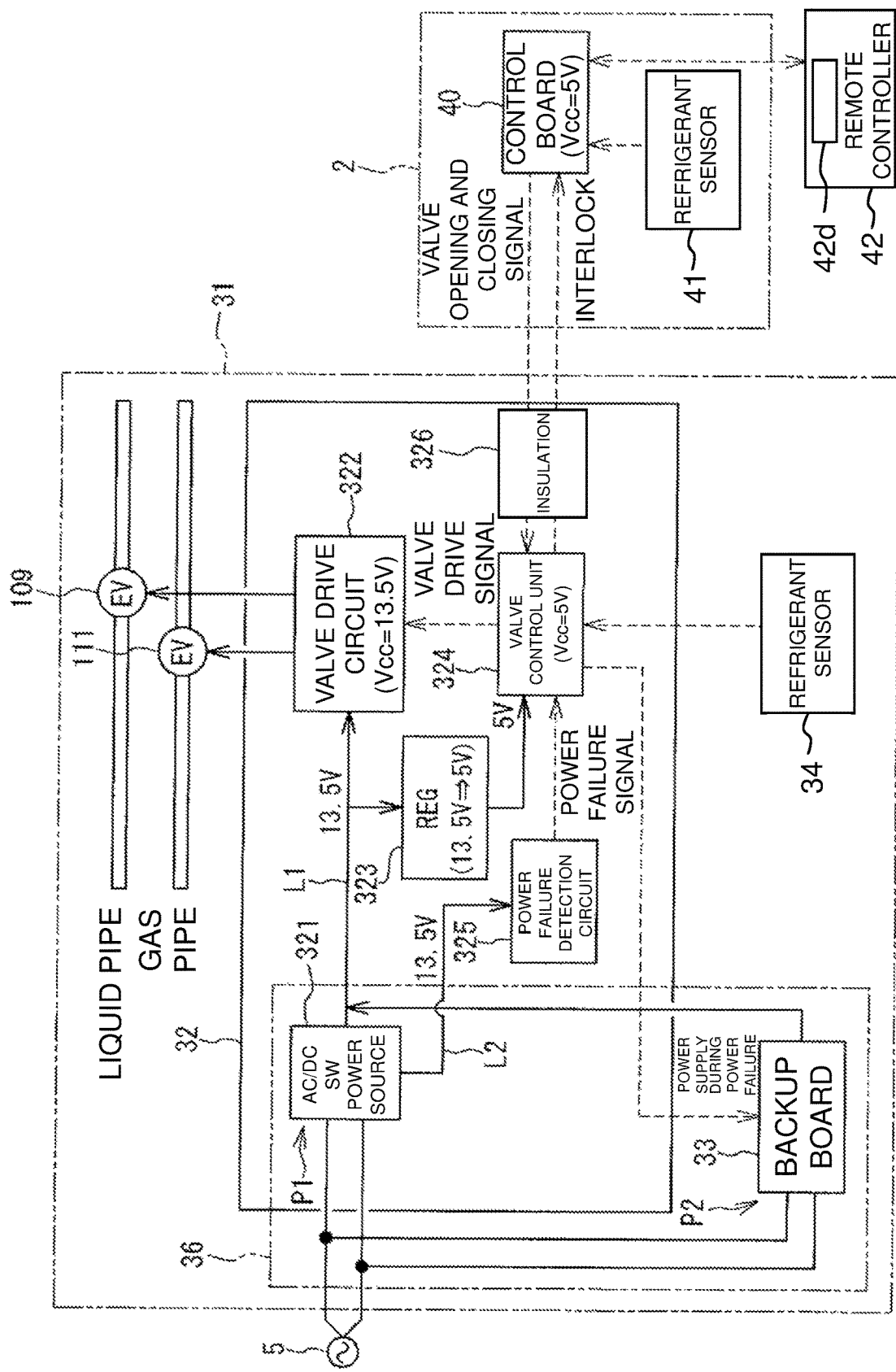
FIG. 16 is a circuit diagram illustrating a valve kit in detail, and is a diagram corresponding to FIG. 11 in a third embodiment.

FIG. 16 is a circuit diagram illustrating a valve kit 31 in detail, and is a diagram corresponding to FIG. 11 in the third embodiment. The difference from FIG. 11 is that a circuit can transmit a signal for notifying of a power failure from a valve control unit 324 to the backup board 33. Other configurations and functions are similar, and thus description thereof is omitted.

(6-2) Backup Board

Figure 17:
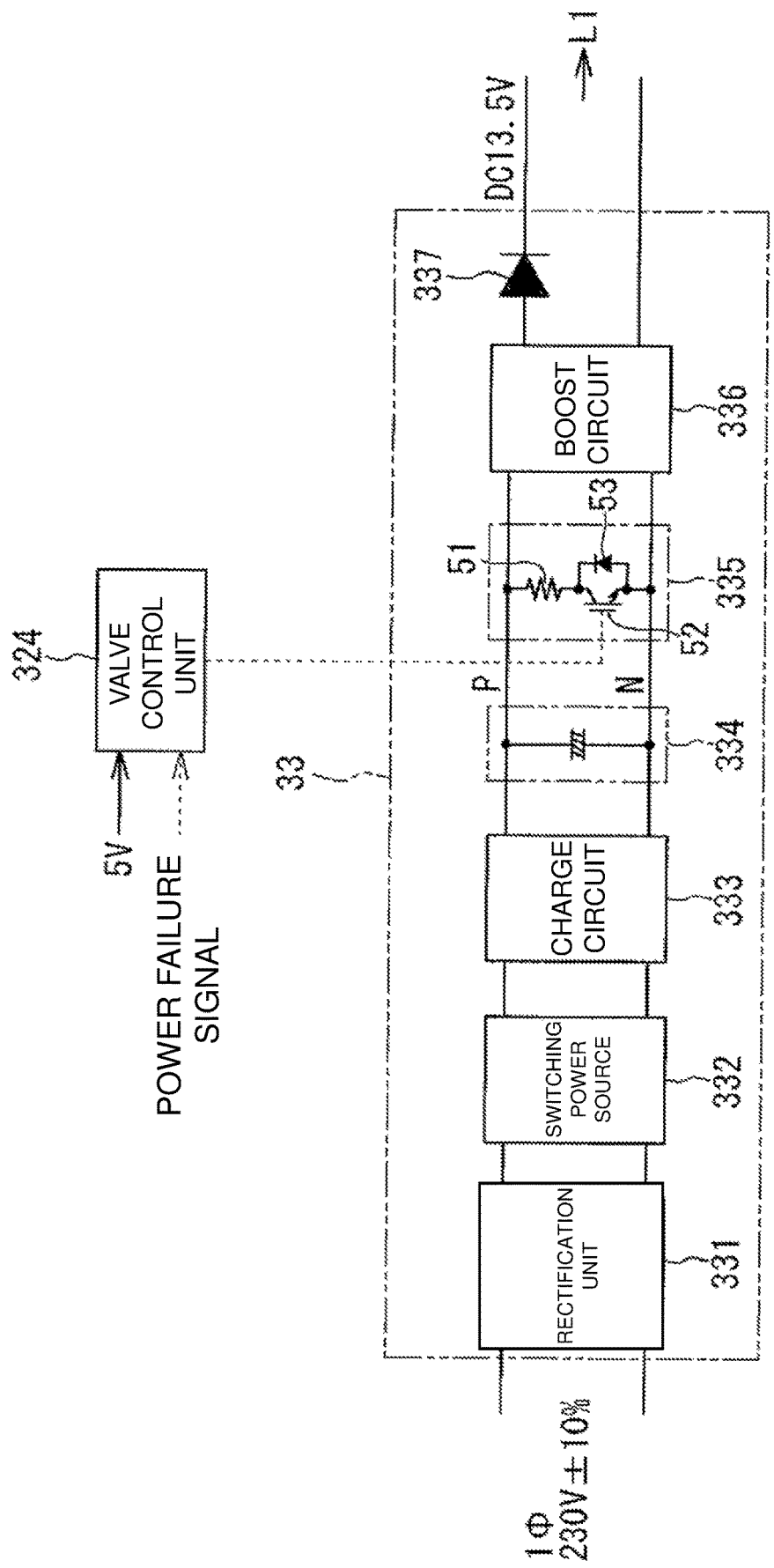
FIG. 17 is an internal circuit diagram of the backup board, and is a diagram corresponding to FIG. 12 in the third embodiment.

FIG. 17 is an internal circuit diagram of the backup board 33, and is a diagram corresponding to FIG. 12 in the third embodiment. The difference from FIG. 12 is that a discharge switch for manual operation is not provided in a discharge circuit 335, and a semiconductor switch 52 is controlled to be turned on or off by a control signal (a gate signal) from the valve control unit 324. Other circuit configurations are similar to those in FIG. 12.

In a circuit configuration of FIG. 17, in a state where a predetermined AC voltage (230 V±10%) is supplied from an AC power source 5 (FIG. 16), 5 V is supplied to the valve control unit 324, and a power failure signal does not come. Therefore, the valve control unit 324 causes an off state of the semiconductor switch 52, and the discharge circuit 335 does not discharge the power storage 334.

(6-3) Operation at Time of Power Failure

Figure 18:
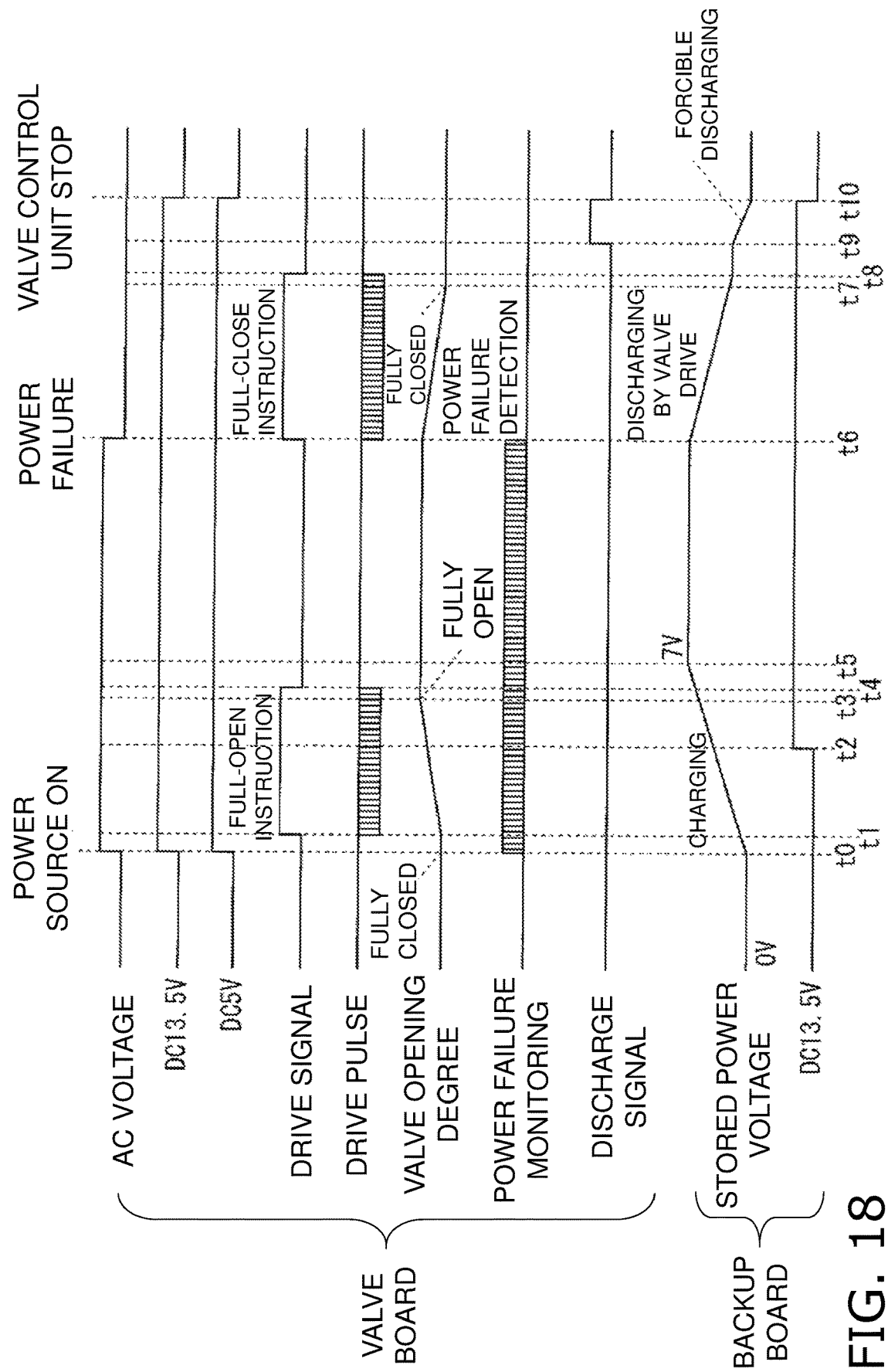
FIG. 18 is a time chart illustrating operation of each unit when a power failure occurs from a normal state of an AC power source (this also includes the case where the AC power source is shut off by an operation).

FIG. 18 is a time chart illustrating operation of each unit when a power failure occurs from a normal state of the AC power source 5 (FIG. 16) (this also includes the case where the AC power source 5 is shut off by an operation). Regarding the valve board 32 (FIG. 16), the figure represents, in order from the top, an AC voltage, the presence or absence of 13.5 V DC output, the presence or absence of 5 V DC output, a drive signal to control valves 109 and 111 (FIG. 16), a drive pulse output from a valve drive circuit 322 (FIG. 16), a valve opening degree, power failure monitoring by a power failure detection circuit 325 (FIG. 16), and an output of a discharge signal, of the valve board 32. Regarding the backup board 33 (FIG. 16, FIG. 17), the figure represents a stored power voltage of the power storage 334 (FIG. 17) and the presence or absence of 13.5 V DC output, of the backup board 33.

When the AC voltage is supplied at time t0, 13.5 V DC and 5 V DC are output in the valve board 32 (FIG. 16), and power failure monitoring by the power failure detection circuit 325 (FIG. 16) is started. In the backup board 33 (FIG. 16, FIG. 17), the power storage 334 (FIG. 17) starts to be charged, and the stored power voltage starts to rise. At time t1, a drive signal (a full-open instruction) of the control valves 109 and 111 (FIG. 16) is output, and a drive pulse is output. As a result, the fully closed control valves 109 and 111 start to open. At time t2, 13.5 V DC of the backup board 33 is enabled to be output.

At time t3, a valve opening degree becomes "fully open". At time t4 immediately after that, the drive signal and the drive pulse are stopped.

At time t5, the stored power voltage reaches, for example, an upper limit of 7 V. Thereafter, the same state continues as long as the normal operation continues.

Next, assuming that a power failure of the AC power source 5 (FIG. 16) occurs at time t6, the power failure detection circuit 325 (FIG. 16) detects the power failure. An output voltage of an AC and DC switching power source 321 (FIG. 16) becomes 0 V. At the same time, 13.5 V DC is supplied from the backup board 33 (FIG. 16, FIG. 17) to a first output electric path L1 (FIG. 16), from the power storage 334 (FIG. 17) via a boost circuit 336 (FIG. 17) and a diode 337 (FIG. 17).

As a result, in FIG. 16, 13.5 V DC in the first output electric path L1 and 5 V DC downstream thereof are maintained, and the valve control unit 324 can also continue to operate. The valve control unit 324 outputs a drive signal for instructing the valve drive circuit 322 to fully close the control valves 109 and 111. In response to this, the valve drive circuit 322 outputs a drive pulse and starts to close the control valves 109 and 111.

Thereafter, the stored power voltage gradually decreases due to discharge, but 13.5 V DC is maintained by the boost circuit 336 (FIG. 17). At time t7, the control valves 109 and 111 are fully closed. At time t8 immediately after that, the drive signals for the control valves 109 and 111 are turned off, and the valve drive circuit 322 stops outputting the drive pulse. At this time, electric charges of the power storage 334 still remain, and the stored power voltage is in a state of several volts.

The valve control unit 324 (FIG. 17) having received the power failure signal at time t6 stands by until time t9. Then, at time t9, a discharge signal for turning on the semiconductor switch 52 (FIG. 17) is output. As a result, a current flows between a P line and an N line through the discharge resistor 51, and the remaining electric charges of the power storage 334 (FIG. 17) are rapidly discharged. At time t10 when the stored power voltage drops to near 0, the boost circuit 336 (FIG. 17) can no longer output 13.5 V DC, and 13.5 V DC sent to the valve board 32 (FIG. 16) and 5 V DC based on this 13.5 V DC both become 0 V. At this point, a microcomputer of the valve control unit 324 (FIG. 16) stops operating, and the discharge signal is no longer output. Therefore, the semiconductor switch 52 of the discharge circuit 335 (FIG. 17) is turned off.

In this way, at a time of power failure, electric charges remaining in the power storage 334 can be automatically discharged by the discharge circuit 335 without depending on a human operation. Therefore, the voltage of the electric path (between the P line and the N line) connected to the power storage 334 can be lost by reliable rapid discharge of the electric charges.

Figure 19:
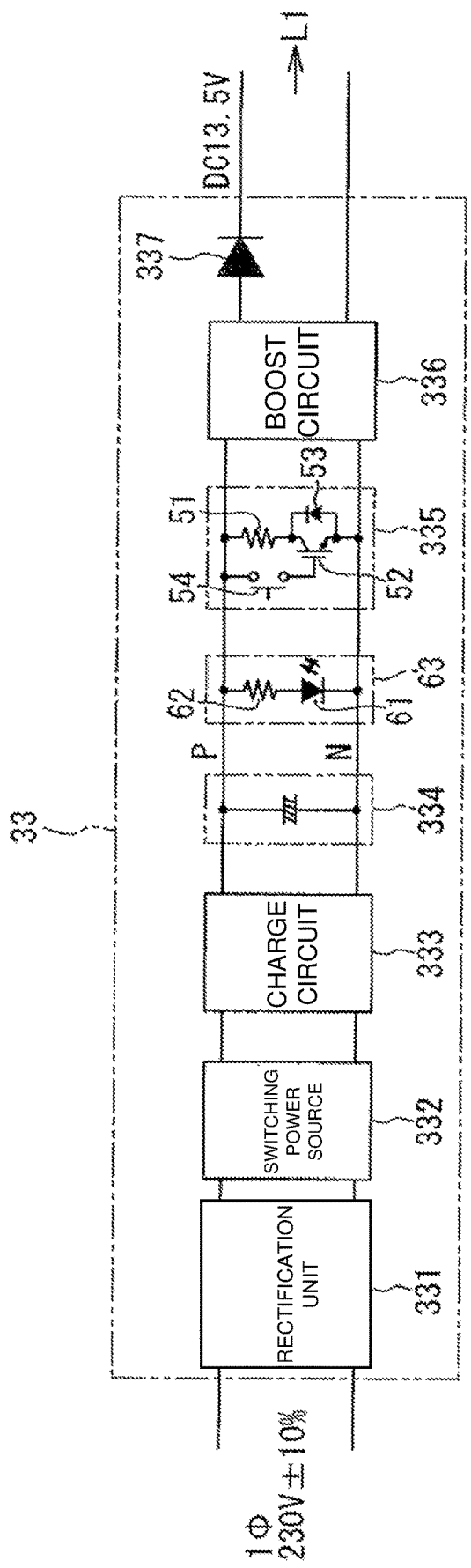
FIG. 19 is a diagram illustrating another circuit configuration example of the backup board.

(7) Modification of Third Embodiment and Fourth Embodiment (7-1) Notification Device FIG. 19 is a diagram illustrating another circuit configuration example of the backup board 33. The difference from FIG. 12 is that a notification device 63, which is a series body of a resistor 62 and an LED 61, is provided between the P line and the N line at both ends of the power storage 334, and other circuit configurations are similar to those in FIG. 12. Regarding a physical arrangement, the LED 61 is preferably provided at a more conspicuous position when the backup board 33 is exposed for inspection (FIG. 14). The conspicuous position is preferably, for example, near the discharge switch 54. In addition to the case where the cover 1c (FIG. 14) described above is removed, in the case where the discharge switch 54 is present at a position where another housing portion is removed, it is preferable to provide the LED 61 in the vicinity thereof. The emission color is preferably red.

Subsequent operations when the power failure occurs are similar to those in the third embodiment, but the LED 61 is turned on when an electric charge remains in the power storage 334. Therefore, the inspection worker can easily confirm visually that an electric charge remains in the power storage 334. When the discharge switch 54 is closed to start discharging, electric charges are discharged, and a current gradually stops flowing through the LED 61, so that the LED 61 is turned off. Since completion of discharging can be confirmed by turning off of the LED 61, it is convenient for the inspection work. Visual confirmation is also unaffected by ambient noise. Although the LED 61 is turned on during the normal operation, power consumption is extremely small, so that power consumption of the entire heat pump device is not substantially affected.

For the notification device, it is also possible to mount on the backup board 33 and use a simple and inexpensive display using a voltage between the P line and the N line or an output voltage of the boost circuit 336 as a power source. In this case, for example, when a voltage equal to or higher than a certain value is applied, characters or symbols for calling attention to the inspection worker are displayed. When the power storage 334 completes discharging, the display also disappears.

Instead of the discharge resistor 51, a component that emits warning sound, such as a buzzer, having an equivalent resistance value, may be attached as the notification device. In this case, sound is generated when the discharge switch 54 is closed, but the sound gradually decreases with discharge, and the inspection worker can recognize the completion of discharging by the sound.

(7-2) Interlock Function

Figure 20:
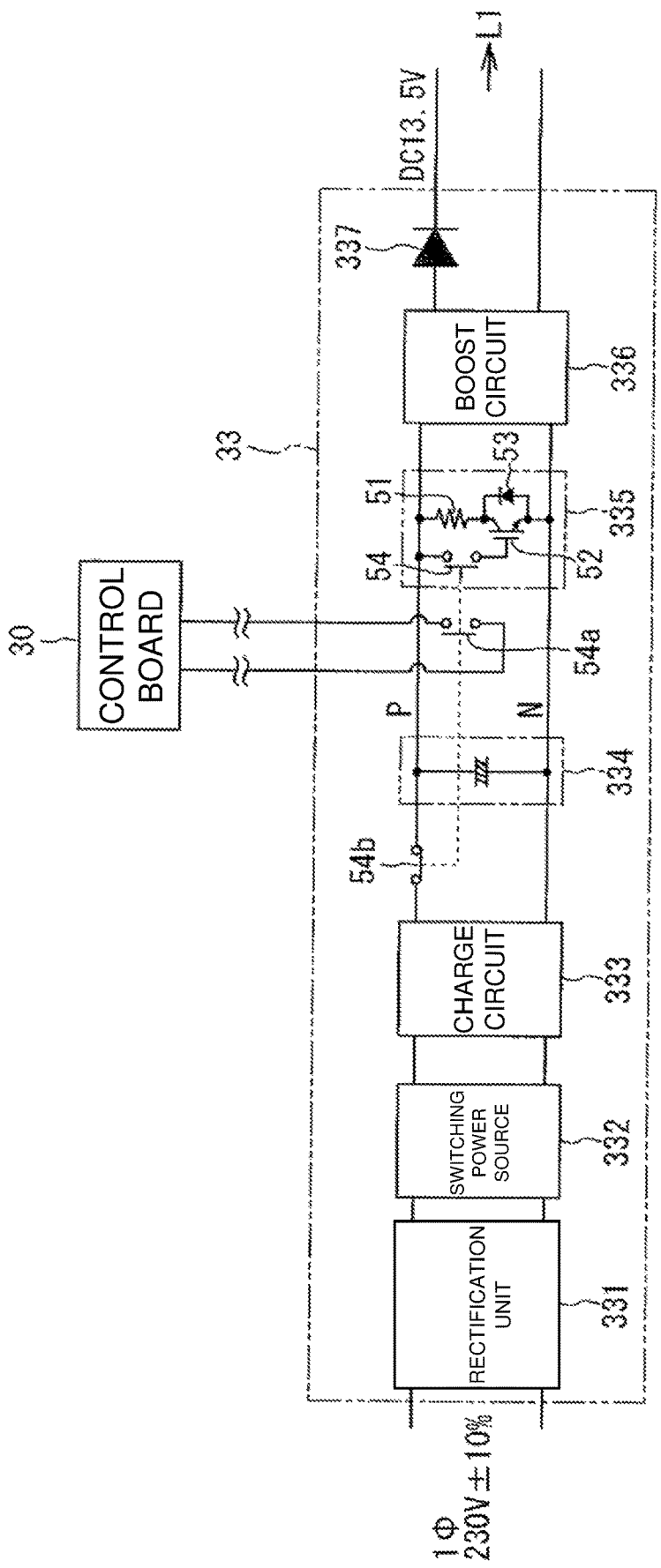
FIG. 20 is a diagram illustrating still another circuit configuration example of the backup board.

FIG. 20 is a diagram illustrating still another circuit configuration example of the backup board 33. The difference from FIG. 12 is that a circuit is adopted including a discharge switch 54 that is a contact for closing by an operation and contacts 54a and 54b for interlock that are auxiliary contacts of the discharge switch, and other circuit configurations are similar to those in FIG. 12. The contact 54a is a normally-open contact, and the contact 54b is a normally-closed contact. The contact 54a is provided to transmit a signal to a control board 30. The contact 54b is provided to prevent the power storage 334 from being recharged during discharging.

In FIG. 20, while the inspection worker closes the discharge switch 54, the contact 54a is also closed. Whereas, the contact 54b is open. Therefore, the power storage 334 cannot be charged at the same time during discharging. In addition, the contact 54a transmits a signal indicating that the path is closed to the control board 30, to prevent the heat pump device from being operated. When the operation cannot be performed, the AC power source 5 may be made not to be connected to the valve kit 31 even if the original AC power source of the heat pump device is restored. In this way, it is possible to suppress charging of the power storage 334 or energization to the backup board 33, during discharging of the power storage 334 by the inspection worker. Note that the contact 54a may be opened during the operation of the discharge switch 54 since the contact 54a is only required to be able to operate in conjunction with the operation of the discharge switch 54 and transmit a signal indicating close or open to the control board 30.

Figure 21:
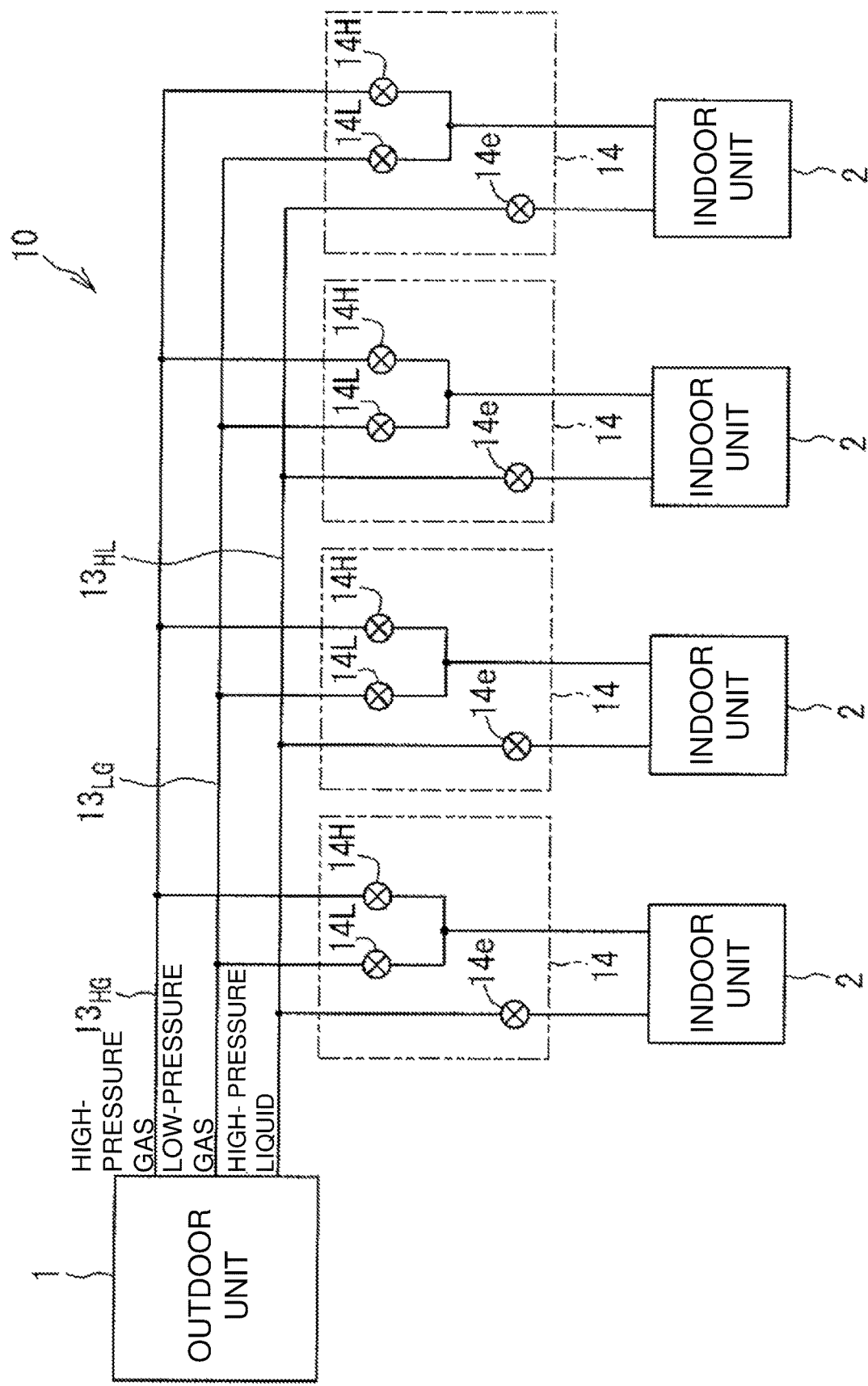
FIG. 21 is a diagram illustrating an example of a configuration in a case where an air conditioner is of simultaneous cooling and heating.

(7-3) Supplement to Application Example of Backup Board Including Discharge Circuit FIG. 21 is a diagram illustrating an example of a configuration in the case where the air conditioner 10 is of simultaneous cooling and heating.

In the figure, from the outdoor unit 1 of simultaneous cooling and heating, a plurality of (here four) flow path switching units 14 are connected via a high-pressure gas pipe $13_{HG}$ through which a high-pressure gas refrigerant flows, a low-pressure gas pipe $13_{LG}$ through which a low-pressure gas refrigerant flows, and a high-pressure liquid pipe $13_{HL}$ through which a high-pressure liquid refrigerant flows. The indoor unit 2 is connected to each of these flow path switching units 14. The flow path switching unit 14 and the indoor unit 2 form a refrigerant circuit that shares the outdoor unit 1. Note that, although the four flow path switching units 14 and the indoor unit 2 are illustrated here, the number is merely an example for convenience of illustration. The flow path switching unit 14 may be of either an outdoor installation or an indoor installation.

Each of the flow path switching units 14 includes an electric valve 14H connected to the high-pressure gas pipe $13_{HG}$, an electric valve 14L connected to the low-pressure gas pipe $13_{LG}$, and an electric valve 14e connected to the high-pressure liquid pipe $13_{HL}$.

The air conditioner 10 of simultaneous cooling and heating described above can cause any indoor unit 2 to perform an air conditioning (cooling or heating) operation as a use-side unit under the outdoor unit 1 common as a heat source-side unit. The flow path switching unit 14 can also cause some of the indoor units 2 to perform cooling and other indoor units 2 to perform heating. Specifically, controlling opening and closing of electric valves 14H and 14L enables the refrigerant flow path to be switched. As necessary, controlling an opening degree of the electric valve 14e enables adjustment of the flow rate of a refrigerant flowing through a heat exchanger in the indoor unit 2. The electric valves 14H, 14L, and 14e in the flow path switching unit 14 can also be used as shutoff valves.

The electric valves 14H, 14L, and 14e described above are also control valves subjected to open and close control by electric energy. Therefore, circuit elements mounted on the valve board 32 and the backup board 33 as illustrated in FIG. 11 or 16 can be similarly applied.

Even in the case where the heat pump device includes a plurality of indoor units and is provided with the control valve as a unit outside of the indoor unit, the circuit elements mounted on the valve board 32 and the backup board 33 can be similarly applied.

Further, there may also be an intermediate unit in a heat pump device having a binary refrigerant circuit, such as a chiller system. Even in such an intermediate unit, as long as there is an electric valve inside, circuit elements mounted on the valve board 32 and the backup board 33 as illustrated in FIG. 11 or 16 can be similarly applied.

(7-4) Another Example of Time Chart

Figure 22:
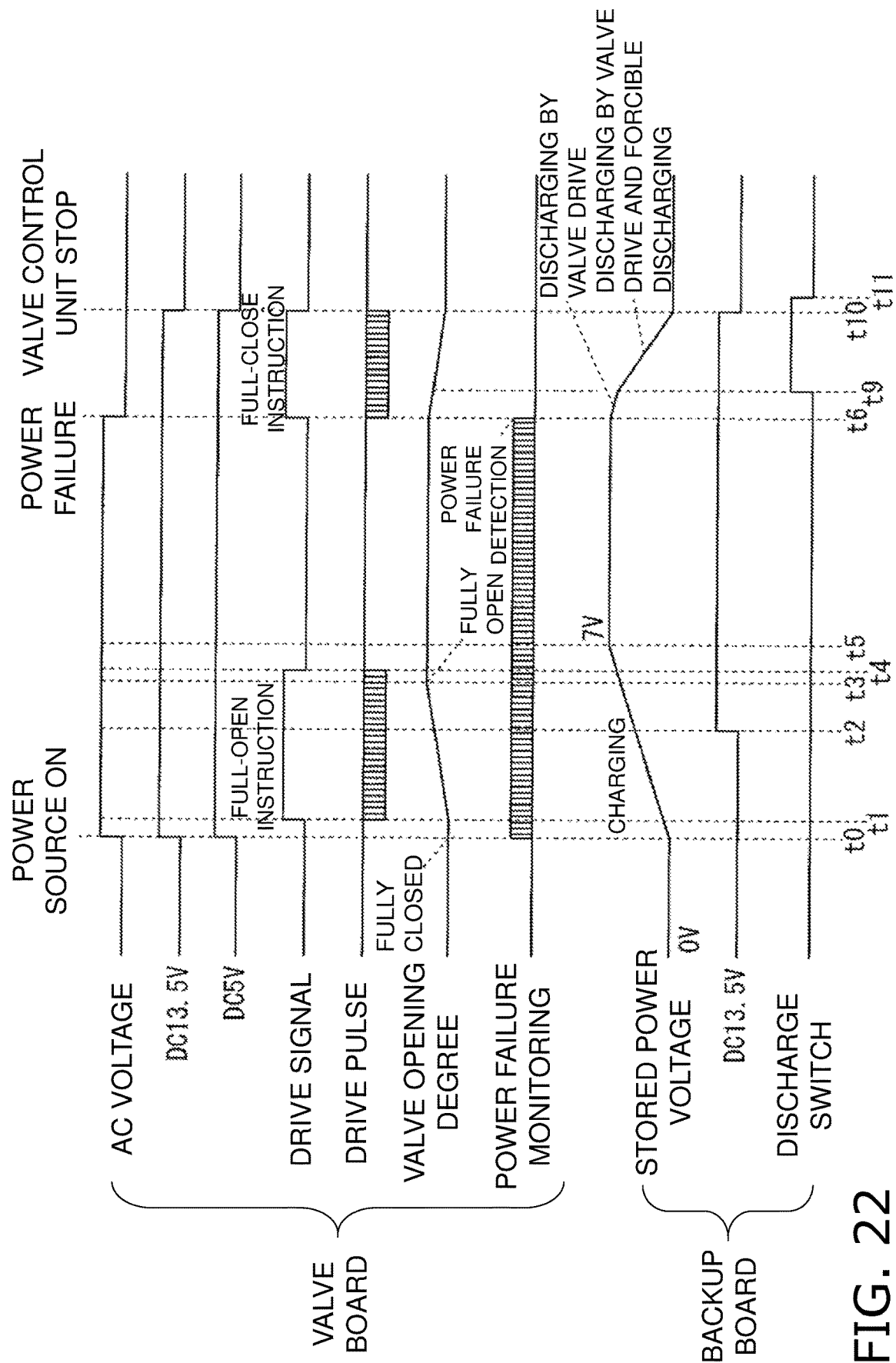
FIG. 22 is an example of another time chart different from that in FIG. 13.

FIG. 22 is an example of another time chart different from FIG. 13. The difference from FIG. 13 is in and after time t6. For example, when the inspection worker shuts off the AC power source 5 (FIG. 11) for inspection at time t6 to cause the same state as a power failure, the power failure detection circuit 325 (FIG. 11) detects the power failure. The output voltage of the AC and DC switching power source 321 (FIG. 11) becomes 0 V. At the same time, 13.5 V DC is supplied from the backup board 33 (FIG. 11, FIG. 12) to the first output electric path L1 (FIG. 11), from the power storage 334 (FIG. 12) via the boost circuit 336 (FIG. 12) and the diode 337 (FIG. 12).

As a result, in FIG. 11, 13.5 V DC in the first output electric path L1 and 5 V DC downstream thereof are maintained, and the valve control unit 324 can also continue to operate. The valve control unit 324 outputs a drive signal for instructing the valve drive circuit 322 to fully close the control valves 109 and 111. In response to this, the valve drive circuit 322 outputs a drive pulse and starts to close the control valves 109 and 111.

The stored power voltage gradually starts to decrease due to the discharge, but the inspection worker who desires to accelerate the discharge turns on (closes) the discharge switch 54 at time t9. Thereafter, the discharge is accelerated by the discharging by the valve drive and the forcible discharging by the discharge circuit 335. Then, at time t10, the 13.5 V DC supplied to the valve control unit 324 (FIG. 11) becomes zero, and the microcomputer of the valve control unit 324 stops operating. This also stops the drive signal, and the valve opening degree also stops as it is at that time. Thereafter, the inspection worker opens the discharge switch 54 at time t11.

In this way, at a time of power failure, the inspection worker can quickly discharge the electric charges remaining in the power storage 334 by the discharging by the valve drive and the discharging by the discharge circuit 335. Therefore, the voltage of the electric path (between the P line and the N line) connected to the power storage 334 can be lost by rapid discharge of the electric charges. When there is no risk of refrigerant leakage, the power storage 334 can also be discharged in this manner.

Figure 23:
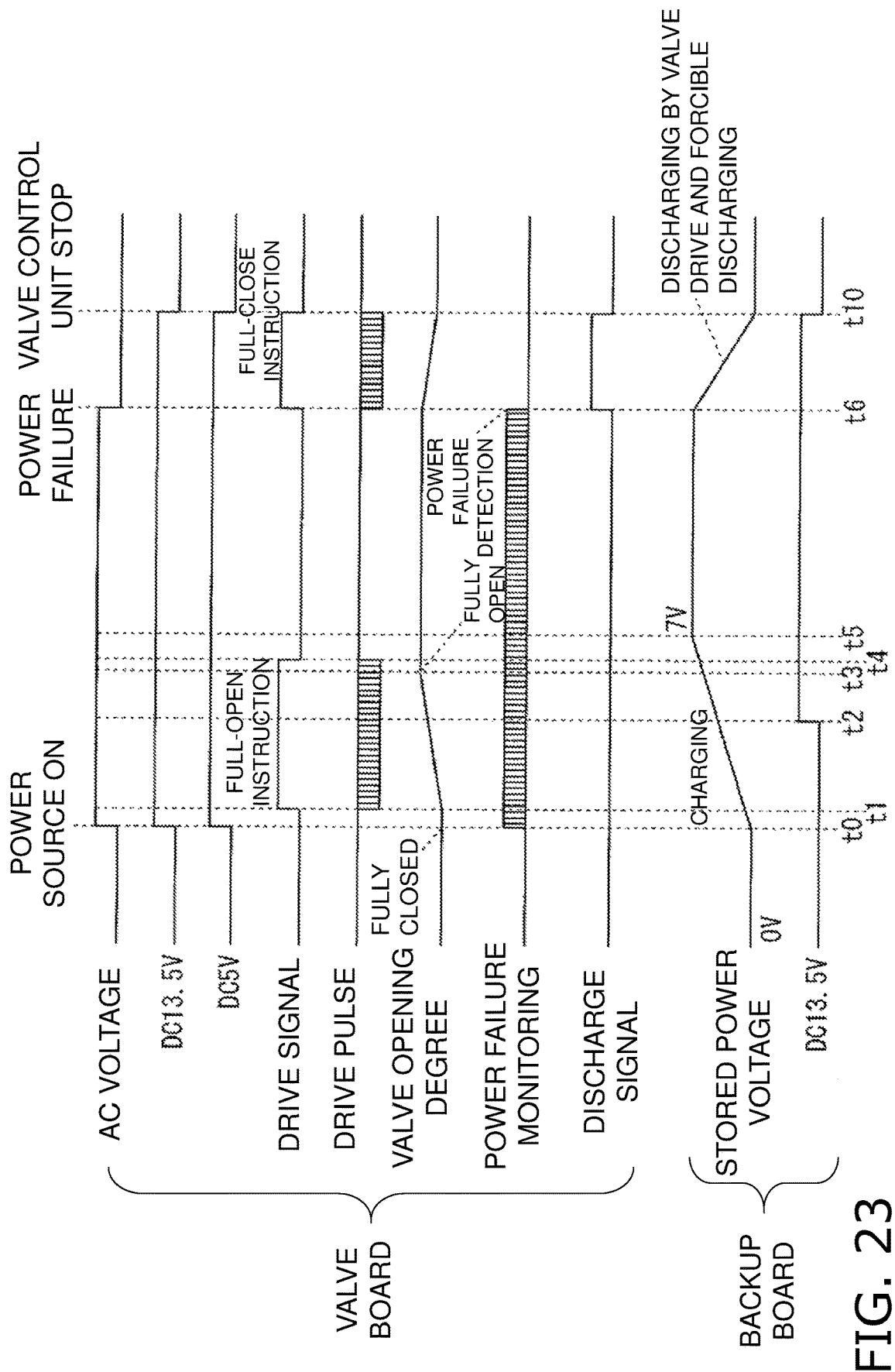
FIG. 23 is an example of another time chart different from that in FIG. 18.

FIG. 23 is an example of another time chart different from FIG. 18. The difference from FIG. 18 is in and after time t6. For example, when the inspection worker shuts off the AC power source 5 (FIG. 16) for inspection at time t6 to cause the same state as a power failure, the power failure detection circuit 325 (FIG. 16) detects the power failure. The output voltage of the AC and DC switching power source 321 (FIG. 16) becomes 0 V. At the same time, 13.5 V DC is supplied from the backup board 33 (FIG. 16, FIG. 17) to the first output electric path L1 (FIG. 16), from the power storage 334 (FIG. 17) via the boost circuit 336 (FIG. 17) and the diode 337 (FIG. 17).

As a result, in FIG. 16, 13.5 V DC in the first output electric path L1 and 5 V DC downstream thereof are maintained, and the valve control unit 324 can also continue to operate. The valve control unit 324 outputs a drive signal for instructing the valve drive circuit 322 to fully close the control valves 109 and 111. In response to this, the valve drive circuit 322 outputs a drive pulse and starts to close the control valves 109 and 111.

Whereas, the valve control unit 324 (FIG. 17) having received a power failure signal at time t6 outputs a discharge signal for turning on the semiconductor switch 52 (FIG. 17). Thereafter, the discharge is accelerated by the discharging by the valve drive and the forcible discharging by the discharge circuit 335. Then, at time t10, the 13.5 V DC supplied to the valve control unit 324 (FIG. 17) becomes zero, and the microcomputer of the valve control unit 324 stops operating. This also stops the drive signal, and the valve opening degree also stops as it is at that time. When the operation of the valve control unit 324 is stopped, the semiconductor switch 52 of the discharge circuit 335 (FIG. 17) is turned off.

In this way, at a time of power failure, electric charges remaining in the power storage 334 can be quickly discharged by the discharging by the valve drive and the discharging by the discharge circuit 335, automatically without depending on a human operation. Therefore, the voltage of the electric path (between the P line and the N line) connected to the power storage 334 can be lost by rapid discharge of the electric charges. When there is no risk of refrigerant leakage, the power storage 334 can also be discharged in this manner.

(7-5) Second Power Source Circuit Unit in Series

In the above disclosure, the example has been described in which the first power source circuit unit P1 and the second power source circuit unit P2 are connected in parallel to each other, but series connection is also possible.

Figure 24:
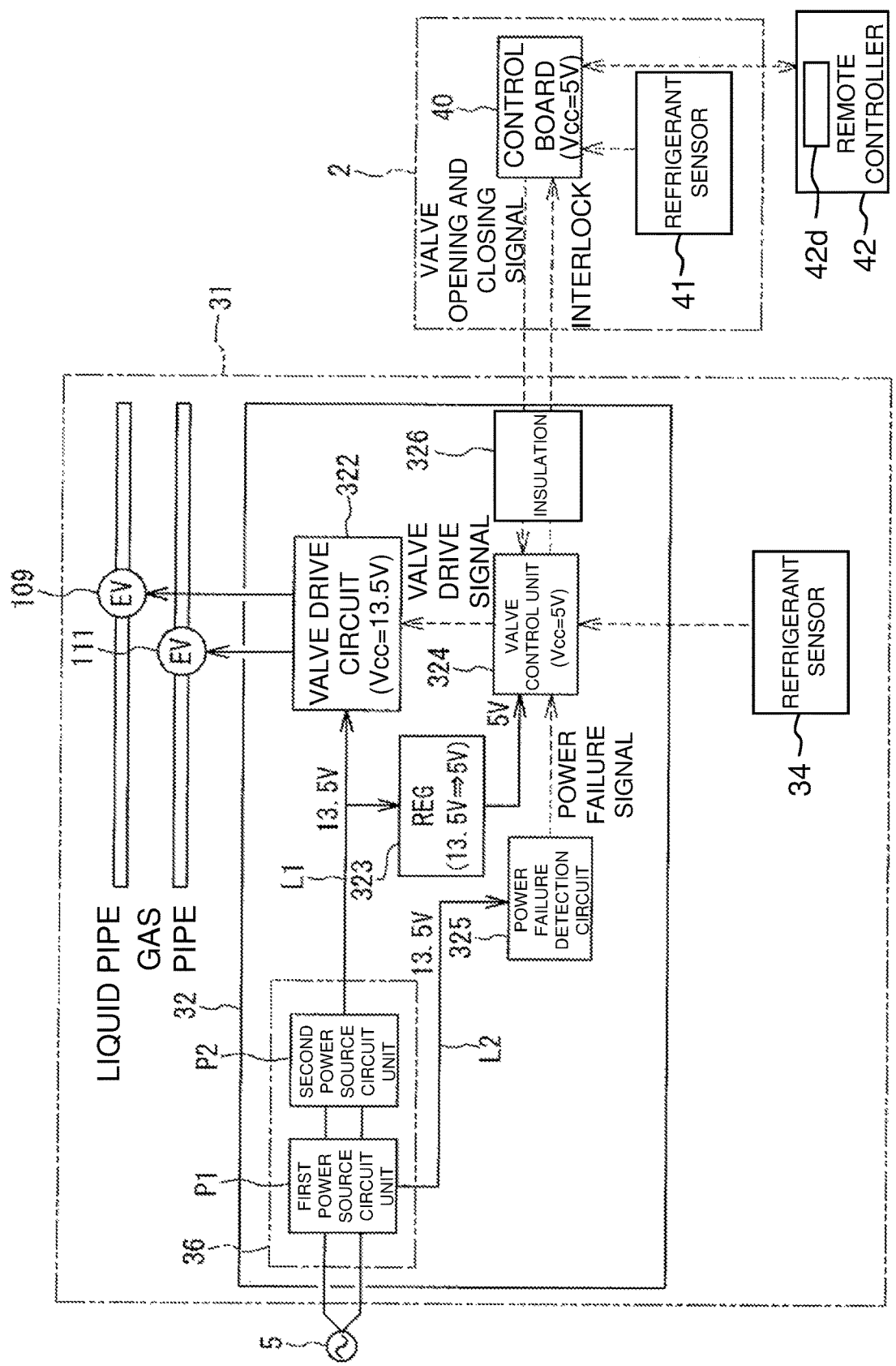
FIG. 24 is a diagram illustrating an example of a power source circuit different from that in FIG. 11.
Figure 25:
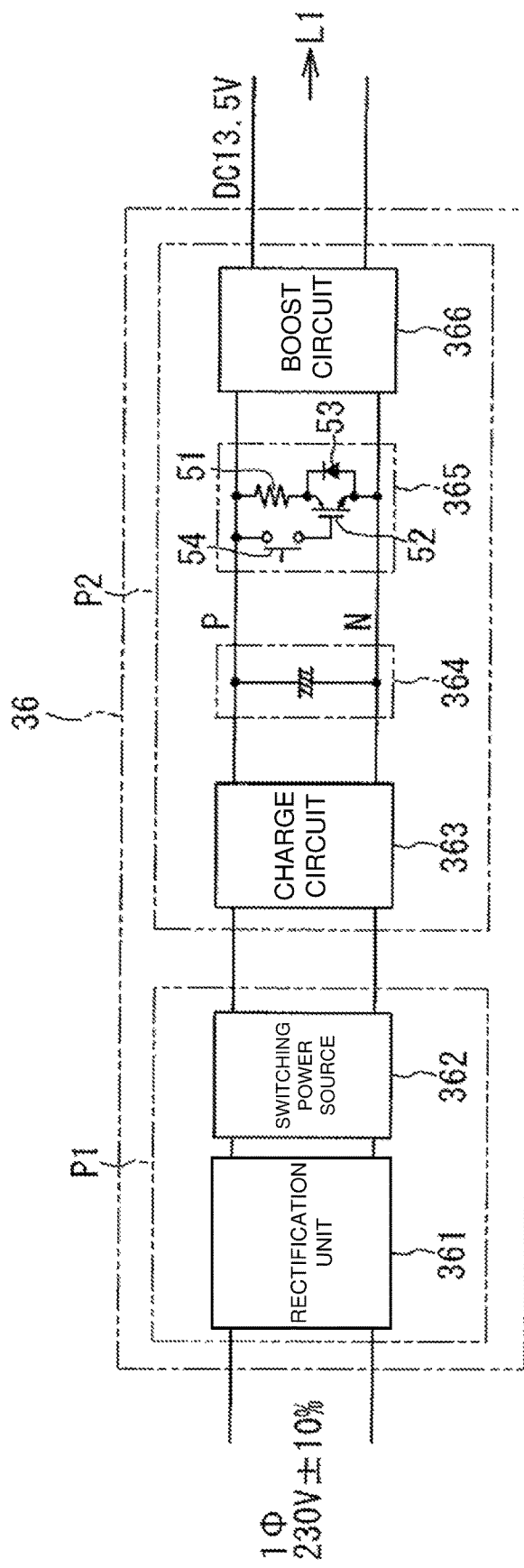
FIG. 25 is an internal connection diagram of only the power source circuit in FIG. 24.

FIG. 24 is a diagram illustrating an example of a power source circuit 36 different from that in FIG. 3. FIG. 25 is an internal connection diagram of only the power source circuit 36. In FIGS. 24 and 25, the first power source circuit unit P1 and the second power source circuit unit P2 of the power source circuit 36 are connected in series to each other.

The power source circuit 36 includes the first power source circuit unit P1 on an upstream side and the second power source circuit unit P2 on a downstream side, and is connected as illustrated in FIGS. 24 and 25. In FIG. 25, the first power source circuit unit P1 includes a rectification unit 361 and a switching power source 362. The second power source circuit unit P2 includes a charge circuit 363, a power storage 364 that is an electrolytic capacitor or an electric double-layer capacitor, a discharge circuit 365, and a boost circuit 366. An inside of the discharge circuit 365 is the same as that in FIG. 12.

The rectification unit 361 rectifies and smooths single-phase 230 VAC (±10%) to a DC voltage. The switching power source 362 converts the DC voltage into a stable DC low voltage. The charge circuit 363 charges the power storage 364 based on the DC voltage provided from the switching power source 362. A voltage between a P line and an N line at both ends of the power storage 364 is input to the boost circuit 366. The boost circuit 366 is a semiconductor obtained by integrating a boosting chopper into one chip, and boosts the DC voltage to 13.5 V.

While 230 VAC is being supplied, the power source circuit 36 generates 13.5 V DC based on the AC voltage, and supplies the voltage to the first output electric path L1. When the 230 VAC is lost, the voltage across the power storage 364 is boosted to 13.5 V DC by the boost circuit 366, and the voltage is supplied to the first output electric path L1.

When it is desired to intentionally discharge the power storage 364, as described above, electric charges stored in the power storage 364 can be forcibly discharged by turning on (closing) the discharge switch 54. The discharge circuit 365 may have a configuration similar to that in FIG. 17.

(7-6)

Note that at least some of the above-described embodiments and disclosed matters may be freely combined with each other.

For example, the electric valve in the disclosure described above may be an electromagnetic valve. The valve expressed as the control valve means a general valve that is subjected to open and close control by electric energy.

(8) Summary of Third Embodiment, Fourth Embodiment, and Modification Thereof

A summary of the above disclosure can be expressed in a generalized manner as follows.

Disclosed is the heat pump device including a refrigerant circuit, and the heat pump device includes: the control valves 109 and 111 provided on the refrigerant circuit; the valve drive circuit 322 configured to cause operation of the control valves 109 and 111; the power source circuit 36 configured to supply power to the valve drive circuit 322 based on the AC power source 5, store power in the power storage 334, and supply power from the power storage 334 to the valve drive circuit 322 during a power failure; and the discharge circuit 335 configured to discharge electric charges stored in the power storage 334.

In such a heat pump device, electric charges remaining in the power storage can be discharged by the discharge circuit at a time of power failure. Therefore, a voltage of an electric path connected to the power storage can be lost by rapid discharge of the electric charges. Since the rapid discharge is possible, the inspection worker does not need to wait for natural discharge of the electric charges of the power storage, and the maintenance time can be shortened.

In the heat pump device described above, the discharge circuit 335 includes the discharge switch 54, and discharges electric charges stored in the power storage 334 by closing the discharge switch 54.

In this case, since the discharging is performed by the intentional action of the inspection worker, it is possible to suppress unnecessary discharging such as the case of an instantaneous power failure in which the inspection worker does not need to perform the inspection.

The discharge switch 54 is preferably of an automatic return type.

In this case, a state of discharging is made only during operation, and the discharge circuit does not work if the inspection worker releases a hand. Therefore, it is possible to suppress erroneous meaningless discharging at a time of power restoration from the power failure.

The power source circuit 36 may have an interlock function that enables operation of the heat pump device only when the discharge switch 54 is open.

In this case, it is possible to suppress the operation of the heat pump device in a state where the discharge switch 54 is closed.

In the heat pump device described above, the power failure detection circuit 325 configured to detect a power failure of the AC power source may be provided, and the power failure detection circuit 325 having detected the power failure may cause the discharging by the discharge circuit 335 to be performed.

In this case, when a power failure (including intentional power source shut off) is detected, discharging is automatically performed. Therefore, discharging can be reliably performed without depending on an action of an inspection worker.

The heat pump device described above may include a notification device configured to notify of completion of discharging of the power storage 334 by the discharge circuit 335.

The notification device is, for example, a lamp, a display, a buzzer, or the like. The notification by such a notification device allows the inspection worker to intuitively grasp a state of power storage.

The notification device is only required to be in mutually different notification states (for example, turning on and off, sounding and stopping) before a start of discharging and at the completion of discharging. In this case, a change of a state of the notification allows the inspection worker to easily confirm completion of discharging.

The discharge switch 54 is preferably provided at a position to be exposed when the cover 1c, which is a part of the housing 1A accommodating the power source circuit 36, is removed. In this case, it is easy to find the discharge switch 54.

(9)

Although the embodiments of the present disclosure have been described above, it will be understood that various changes in forms and details can be made without departing from the gist and scope of the present disclosure as set forth in the claims.

REFERENCE SIGNS LIST

3: refrigerant circuit
5: AC power source
36: power source circuit
109: first control valve
111: second control valve
322: valve drive circuit
334: power storage
335: discharge circuit
1017: valve (liquid side)
1018: valve (gas side)
1322: valve drive circuit
1324: valve control unit
1334: electric double-layer capacitor
L1: first output electric path
PW: power source circuit
P1: first power source circuit unit
P2: second power source circuit unit

CITATION LIST

Patent Literature

Patent Literature 1: WO 2018/167811 A1

The invention claimed is:

1. A heat pump device including a refrigerant circuit, the heat pump device comprising:
    a valve provided on the refrigerant circuit and configured to maintain an opening degree during non-energization;
    a valve drive circuit configured to cause operation of the valve;
    a valve controller configured to control the valve drive circuit; and
    a power source circuit configured to supply a power source to the valve drive circuit,
    wherein the power source circuit includes:
    a first power source circuit unit including a first output electric path and configured to receive power source supply from outside to generate a direct current voltage; and
    a second power source circuit unit for backup configured to receive power source supply from the outside to store power in a capacitor, and connect the capacitor in parallel to the first output electric path, wherein
    the refrigerant circuit includes a gas-side refrigerant pipe and a liquid-side refrigerant pipe,
    the valve includes a valve on a gas side provided in the gas-side refrigerant pipe and a valve on a liquid side provided in the liquid-side refrigerant pipe,
    the capacitor has a capacity to store an amount of electricity required to fully close each of the valves from fully open, and
    the valve controller causes each of the valves to perform a close operation in order from any one of the valves.

2. The heat pump device according to claim 1, further comprising a refrigerant sensor configured to detect refrigerant leakage, wherein
    when the refrigerant sensor detects refrigerant leakage, the valve controller causes operation of the valve drive circuit to close the valve in a state where the capacitor is charged.

3. The heat pump device according to claim 1, wherein
    the first power source circuit unit and the valve drive circuit are mounted on a first board, and
    the second power source circuit unit is mounted on a second board different from the first board.

4. The heat pump device according to claim 3, wherein
    the first board is provided with:
    a power failure detection circuit configured to detect a voltage input to the first power source circuit unit or a voltage of a second output electric path, the voltage of the second output electric path being insulated from the first output electric path and output from the first power source circuit unit; and
    the valve controller, and
    the valve controller outputs a command to close the valve in accordance with power failure detection by the power failure detection circuit.

5. The heat pump device according to claim 1, wherein
    the second power source circuit unit includes:
    a rectification unit for a direct current from an alternating current;
    a switching power source unit configured to step down an output voltage of the rectification unit to a predetermined direct current voltage;

a charge circuit unit configured to perform from constant current charging to constant voltage charging based on an output of the switching power source unit;

the capacitor that is an electric double-layer capacitor connected to the charge circuit unit;

a boost circuit unit configured to boost an output voltage of the capacitor to a predetermined direct current voltage; and a diode provided on a positive-side electric path at an output end of the boost circuit unit and having a forward direction in a direction connecting from the positive-side electric path to the first power source circuit unit.

6. The heat pump device according to claim 1, further comprising a remote controller configured to perform an operation manipulation, wherein the remote controller includes a display unit configured to display information related to an open or closed state of the valve.

7. The heat pump device according to claim 1, further comprising a main controller configured to control a refrigeration cycle operation, wherein the main controller performs the refrigeration cycle operation only when the valve controller can communicate with the main controller.

8. The heat pump device according to claim 1, further comprising a discharge circuit configured to discharge an electric charge stored in the capacitor.

9. The heat pump device according to claim 8, wherein the discharge circuit includes a discharge switch, and discharges an electric charge stored in the capacitor by closing the discharge switch.

10. The heat pump device according to claim 9, wherein the discharge switch is of an automatic return type.

11. The heat pump device according to claim 9, wherein the power source circuit has an interlock function that enables operation of the heat pump device only when the discharge switch is in an open state.

12. The heat pump device according to claim 8, further comprising a detection circuit configured to detect a power failure of an AC power source, wherein the detection circuit having detected a power failure causes discharging by the discharge circuit to be performed.

13. The heat pump device according to claim 8, further comprising a notification device configured to notify of completion of discharging of the capacitor by the discharge circuit.

14. The heat pump device according to claim 13, wherein the notification device is to be in mutually different notification states before a start of discharging and at the completion of discharging.

15. The heat pump device according to claim 9, wherein the discharge switch is provided at a position to be exposed when a cover that is a part of a housing accommodating the power source circuit is removed.

* * * * *